United States Patent
Ukai

(10) Patent No.: US 11,226,790 B2
(45) Date of Patent: Jan. 18, 2022

(54) ARITHMETIC PROCESSING APPARATUS WITH DELAY-AND-SWAP PROCESSING CIRCUIT

(71) Applicant: FUJITSU LIMITED, Kawasaki (JP)

(72) Inventor: Megumi Ukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 16/663,406

(22) Filed: Oct. 25, 2019

(65) Prior Publication Data

US 2020/0133634 A1 Apr. 30, 2020

(30) Foreign Application Priority Data

Oct. 30, 2018 (JP) .............................. JP2018-204083

(51) Int. Cl.
*G06F 7/50* (2006.01)
*G06F 9/30* (2018.01)
*H04L 29/08* (2006.01)

(52) U.S. Cl.
CPC .............. *G06F 7/50* (2013.01); *G06F 9/3001* (2013.01); *H04L 69/324* (2013.01)

(58) Field of Classification Search
CPC ...... G06F 13/4291; G06F 7/50; G06F 9/3001; H04L 69/324
See application file for complete search history.

(56) References Cited

U.S. PATENT DOCUMENTS

| 6,122,285 | A | 9/2000 | Okada |
| 6,237,079 | B1 | 5/2001 | Stoney |
| 2007/0028152 | A1 | 2/2007 | Mishra et al. |
| 2008/0123638 | A1 | 5/2008 | Liao |
| 2012/0159121 | A1 | 6/2012 | Inoue et al. |
| 2018/0089136 | A1 | 3/2018 | Hanscom et al. |
| 2019/0007153 | A1* | 1/2019 | Linsky ................ H04L 47/10 |

FOREIGN PATENT DOCUMENTS

| JP | 09-200239 | 7/1997 |
| JP | 11-085969 | 3/1999 |
| JP | 2012-128809 | 7/2012 |

OTHER PUBLICATIONS

Extended European Search Report dated Feb. 18, 2020 for corresponding European Patent Application No. 19203805.7, 7 pages.

* cited by examiner

*Primary Examiner* — Mohamed A. Wasel
(74) *Attorney, Agent, or Firm* — Fujitsu Patent Center

(57) ABSTRACT

An arithmetic processing apparatus includes a delay-&-swap processing circuit configured to, upon detecting that an ending of a first packet received from an input side of a first channel and a beginning of a second packet with one-packet length and received from an input side of a second channel overlap in a same cycle, place an output side of the second channel into a delay state by delaying the output side of the second channel by one cycle, and a packet processing circuit configured to perform processing on packets which are output from the two channels by the delay-&-swap processing circuit.

7 Claims, 22 Drawing Sheets

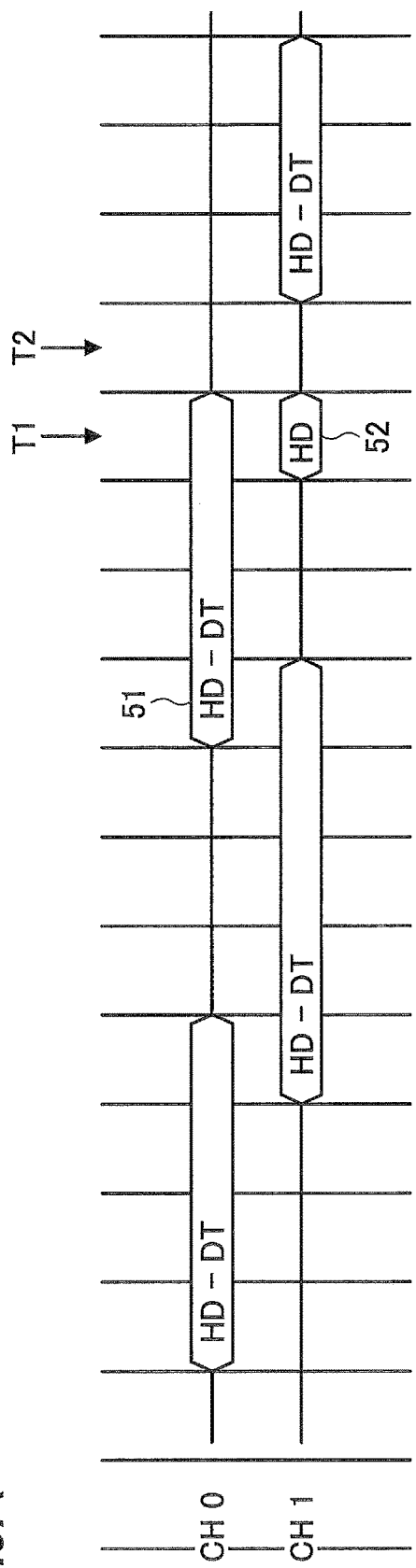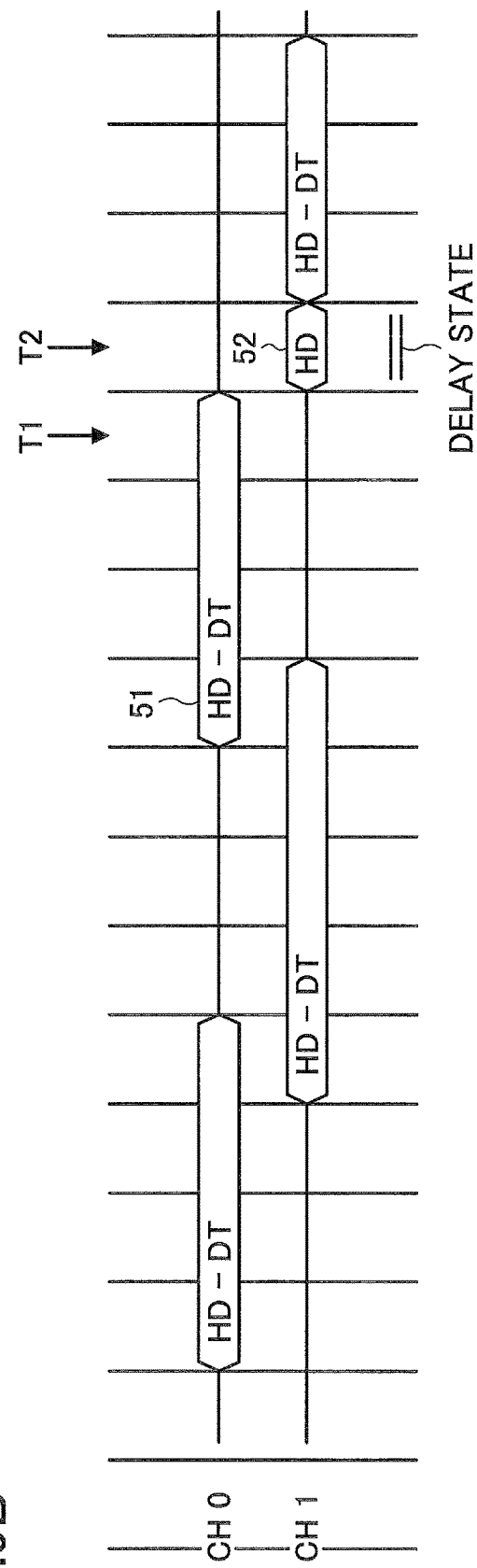

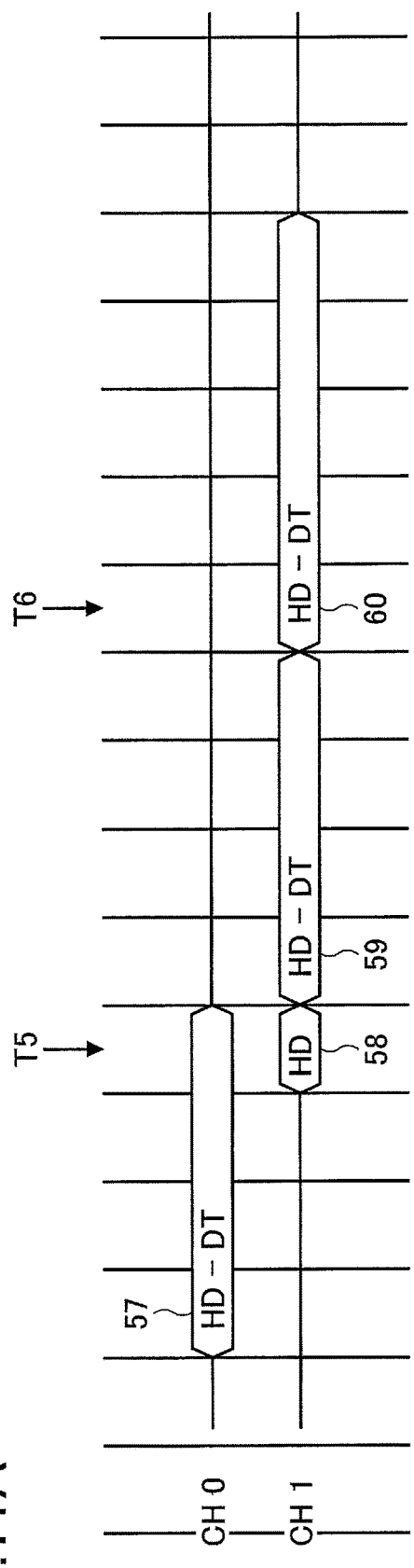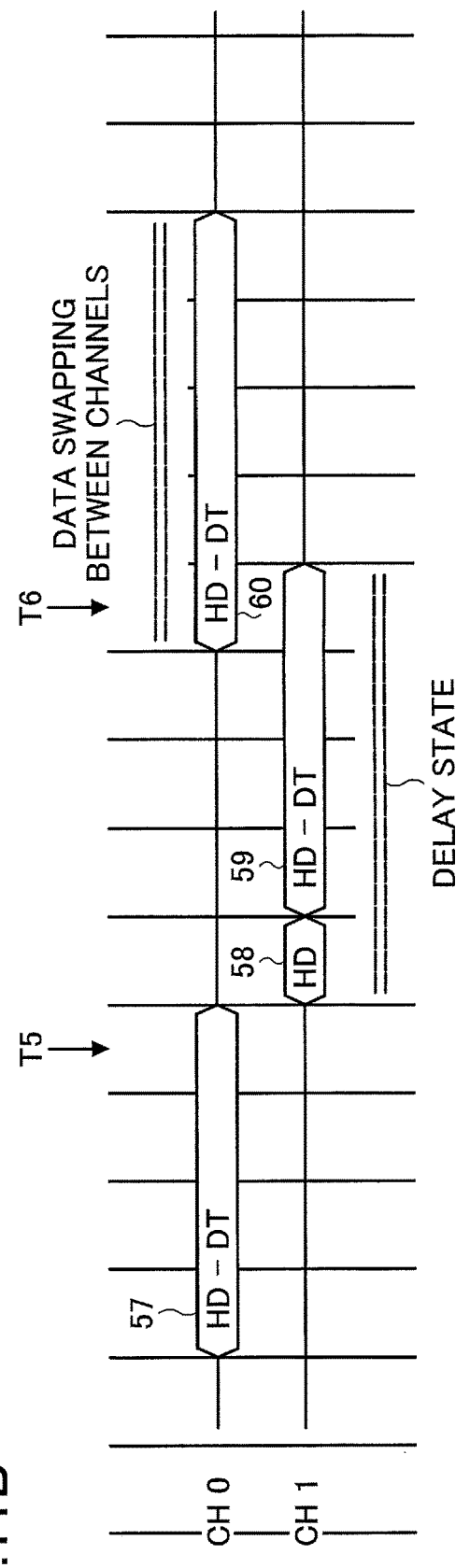

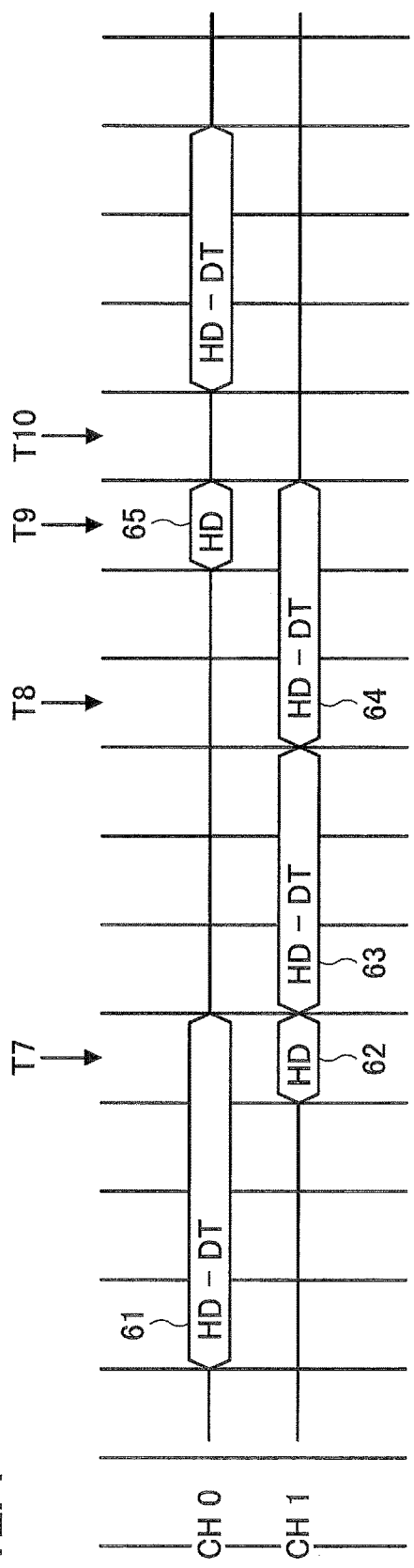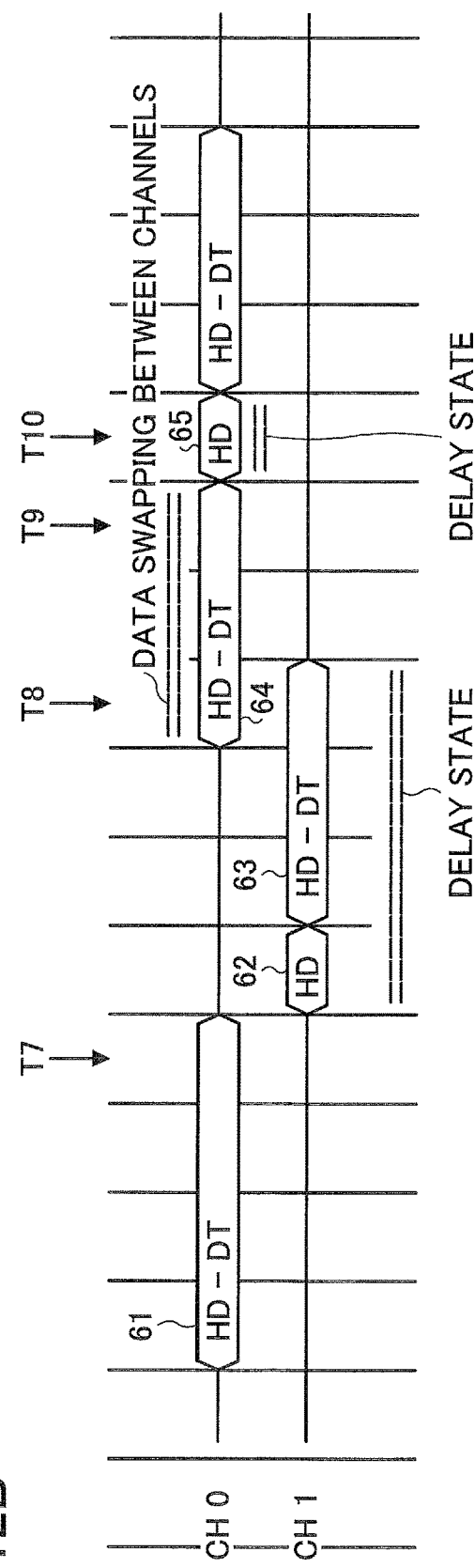

ARITHMETIC PROCESSING APPARATUS WITH DELAY-AND-SWAP PROCESSING CIRCUIT

CROSS-REFERENCE TO RELATED APPLICATIONS

The present application is based upon and claims the benefit of priority from the prior Japanese Patent Application No. 2018-204083 filed on Oct. 30, 2018, with the Japanese Patent Office, the entire contents of which are incorporated herein by reference.

FIELD

The disclosures herein relate to an arithmetic processing apparatus and a control method of the arithmetic processing apparatus.

BACKGROUND

PCIe (Peripheral Component Interconnect Express) is a point-to-point serial link, and is used for mutual connections on the level of motherboards, expansion card interfaces, and the like. PCIe is capable of making mutual connection between two points with 1, 2, 4, 8, 12, 16, or 32 lanes, and a single lane is constituted by four signal lines in which a differential pair is allocated to each of transmission and reception. In PCIe, a hierarchical structure including a software layer, a transaction layer, a data link layer, and a physical layer is defined for control and management of information transmission.

The software layer at the transmission side transmits information (transaction type, address, transmission data quantity, and the like) required for generation of a TLP (Transaction Layer Packet) to the transaction layer in order to request reading and writing. The software layer at the reception side receives, from the transaction layer, information (transaction type, address, reception data quantity, and the like) included in the TLP received by the transaction layer.

The transaction layer generates a TLP including a header, a payload (in a case of write request), and an ECRC (End to End CRC) on the basis of information received from the software layer, and transmits the generated TLP to the data link layer. The header includes an address, a TLP type, a transfer size, a requester ID or a completer ID, a tag, and the like. In this case, the requester ID is included in a request TLP transmitted from the requesting side, and the completer ID is included in a completion TLP transmitted from a responding side that responds to the request. The request TLP and the completion TLP use the same tag. The transaction layer at the reception side checks ECRC error in the TLP received from the data link layer. When there is neither error nor any other deficiencies, the transaction layer transmits the information and the payload included in the header to the software layer. The transaction layer at the transmission side collates a tag of a request TLP during request transmission and a tag of a completion TLP during response reception to check as to whether an expected response has been received (completion check).

The data link layer at the transmission side attaches a sequence number and an LCRC (Link CRC) to the TLP, and transmits the TLP having them attached thereto to the physical layer. Also, a copy of the TLP is saved in a retry buffer. The data link layer at the reception side checks loss of packets and duplicate receptions of TLPs received via the physical layer, on the basis of sequence numbers, and in addition, checks an LCRC error. When there is no error, the data link layer at the reception side generates an ACK-DLLP (Data Link Layer Packet) and transmits the ACK-DLLP to the transmission side, and transmits to the transaction layer a TLP from which the sequence number and the LCRC are removed. The data link layer at the transmission side checks transmission completion of the TLP by receiving the ACK-DLLP from the reception side, and clears the retry buffer. On the other hand, in a case where the data link layer at the transmission side receives an NAK-DLLP indicating error occurrence from the reception side, the data link layer at the transmission side retransmits the TLP saved in the retry buffer.

The physical layer attaches framing characters (i.e., framing symbols or framing tokens) indicating start and end to the TLP or the DLLP received from the data link layer. Depending on specifications and conditions, only a framing character indicating start is attached, and a framing character indicating end is not attached. A packet having a framing character attached thereto is transmitted to the recipient side via the link. When the physical layer receives a packet from the link, the packet is transmitted to the data link layer. The framing character is used to detect the start and the end of the packet. When multiple lanes exist in the link, a packet transmitted from the physical layer to the link is allocated to multiple lanes in order in units of bytes.

In the transmission and reception of information via the link of PCIe, credit-based flow control is performed. The flow control is executed by periodically transmitting a DLLP for flow control in the transaction layer, and control is performed such that, unless there is a space for receiving a TLP in the buffer at the reception side, the TLP is not transmitted from the transmission side.

RELATED-ART DOCUMENTS

Patent Document

[Patent Document 1] Japanese Laid-Open Patent Publication No. H9-200239
[Patent Document 2] Japanese Laid-Open Patent Publication No. 2012-128809
[Patent Document 3] Japanese Laid-Open Patent Publication No. H11-85969

SUMMARY

According to an aspect of the embodiment, an arithmetic processing apparatus includes a delay-&-swap processing circuit configured to, upon detecting that an ending of a first packet received from an input side of a first channel and a beginning of a second packet with one-packet length and received from an input side of a second channel overlap in a same cycle, place an output side of the second channel into a delay state by delaying the output side of the second channel by one cycle, and a packet processing circuit configured to perform processing on packets which are output from the two channels by the delay-&-swap processing circuit.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 9A and 9B are timing charts illustrating a first example of delay-&-swap processing;

FIGS. 11A and 11B are timing charts illustrating a third example of delay-&-swap processing;

FIGS. 12A and 12B are timing charts illustrating a fourth example of delay-&-swap processing;

DESCRIPTION OF EMBODIMENTS

In the following, embodiment of the invention will be described with reference to the accompanying drawings. In these drawings, the same or corresponding elements are referred to by the same or corresponding numerals, and a description thereof will be omitted as appropriate.

Figure 1:
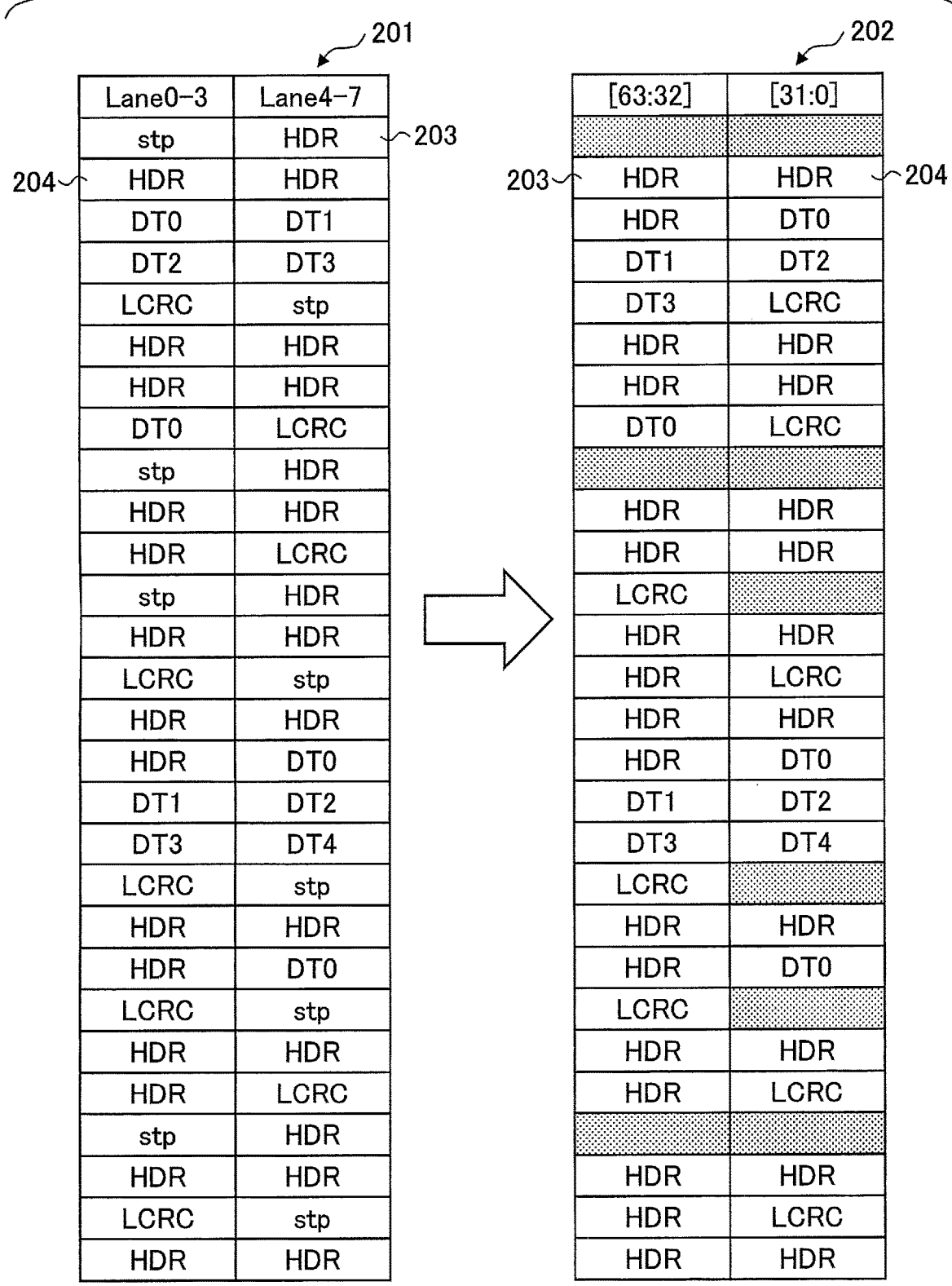
FIG. 1 is a drawing illustrating an example of packet arrangement of data transmission with 8 lanes.

FIG. 1 is a drawing illustrating an example of packet arrangement of data transmission with 8 lanes. A packet arrangement 201 illustrates an example of arrangement of a packet allocated to 8 lanes (Lane 0 to Lane 7) of the physical layer. One byte (8 bits) of information is allocated to one lane, and a packet to be transmitted is allocated in order in units of bytes to 8 lanes (Lane 0 to Lane 7). In the packet arrangement 201 as illustrated in FIG. 1, four lanes are collectively shown in a single frame, and one frame illustrated represents information for 4 byte length. One row (one horizontal row) in the packet arrangement 201 corresponds to a cycle of one symbol.

In order to transmit a TLP, for example, in a case of PCIe-Gen3, information about the TLP provided from the data link layer is arranged in each lane subsequently to an stp token (a framing token indicating start of a TLP). The stp token has 4 byte length, and the information about the TLP includes a header HDR having 3 or 4 double words (12 or 16 bytes) and a payload DT0 to DTPx (x is a positive integer). The payload may include only DT0. In each lane, 128 bits of information is converted into 130 bits through 128b/130b encoding, and the converted information is transmitted serially.

A packet arrangement 202 illustrates an arrangement example in which, when multiple packets illustrated in the packet arrangement 201 are received in the physical layer, framing tokens stp are removed from each packet, and the remaining information (information used in the data link layer) is arranged in a parallel bus having 8 byte width. In a case where information is transmitted and received via a link having 8 lanes, the data link layer and layers thereabove use the parallel bus having 8 byte width to transfer the one symbol in one clock cycle. In FIG. 1, the packet arrangement 201 is shown divided into two groups each having 4 byte width, and accordingly, the packet arrangement 202 is organized in units of four bytes and shown as being divided into higher-order 4 bytes [63:32] and lower-order 4 bytes [31:0]

In the data link layer, in consideration of the ease of downstream processing, the beginning of each packet is aligned to the higher-order 4 bytes [63:32] (i.e., aligned to the left in FIG. 1), and information included in a single packet is continuously arranged without any gap remaining. In a case where the ending of the packet is located at the higher-order 4 bytes [63:32] as a result of arranging the packet in the data link layer as described above, the lower-order 4 byte [31:0] remains as blank.

In the first clock cycle illustrated in FIG. 1, stp and HDR 203 are received in the packet arrangement 201, but if this HDR 203 is arranged in left alignment in the first clock cycle of the packet arrangement 202, the lower-order 4 byte becomes a blank space. Therefore, in the packet arrangement 202, HDR 203 is arranged in left alignment in the second clock cycle, and HDR 204 received in the second clock cycle in the packet arrangement 201 is arranged to the lower-order 4 byte side of the second clock cycle in the packet arrangement 202. Likewise, when each packet of the packet arrangement 201 received in the physical layer is arranged in the 8 byte parallel bus in the data link layer, the arrangement shown as the packet arrangement 202 in FIG. 1 is obtained.

When parallel data of the packet arrangement 202 in the data link layer is generated, 4 bytes of stp token are removed from each packet received in the physical layer. As described above, since the blank space generated as a result of aligning the beginning of the packet to the left is 4 bytes at most, the delay caused by providing this blank space can be compensated by removing 4 bytes of stp token. Therefore, the timing is not gradually delayed when the packet allocated to 8 lanes in the physical layer is arranged in the parallel bus of 8 bytes in the data link layer. In other words, this does not make it impossible for the reception side to receive information transmitted from the transmission side.

Figure 2:
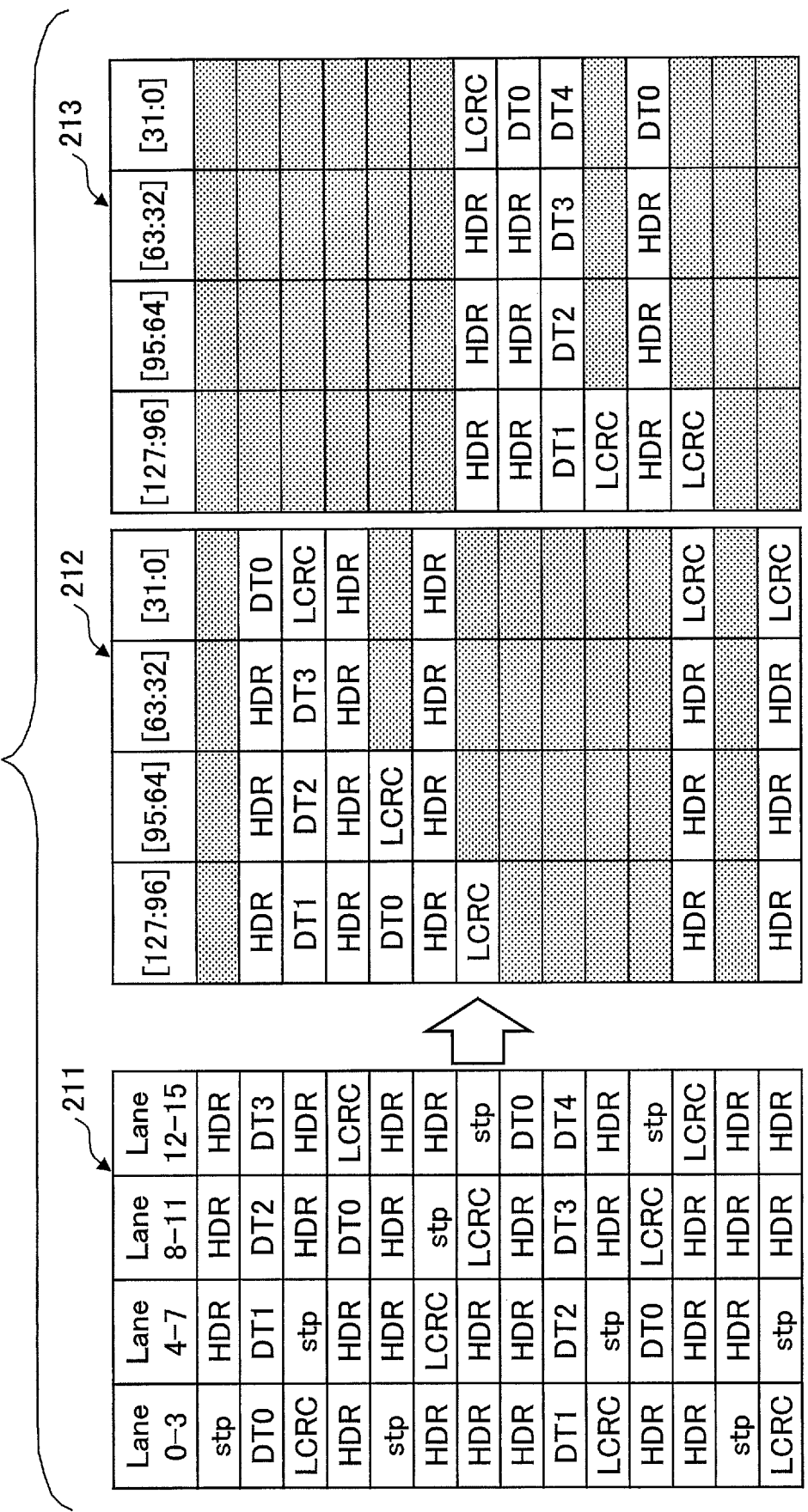
FIG. 2 is a drawing illustrating an example of packet arrangement of data transmission with 16 lanes.

FIG. 2 is a drawing illustrating an example of packet arrangement of data transmission with 16 lanes. A packet arrangement 211 illustrates an example of arrangement of a packet allocated to 16 lanes (Lane 0 to Lane 15) of the physical layer. Information about one byte (8 bits) is allocated to one lane, and a packet to be transmitted is allocated in order in units of bytes to 16 lanes (Lane 0 to Lane 15). In the packet arrangement 211 as illustrated in FIG. 2, four lanes are collectively shown in a single frame, and one frame illustrated represents information for 4 byte length. One row (one horizontal row) in the packet arrangement 211 corresponds to a cycle of one symbol. The configuration of each packet and the manner of information transmission via the link are similar to those of FIG. 1. The principle of arranging the beginning of each packet aligned to the higher-order 4 bytes and arranging information included in a single packet continuously without any gap in the data link layer is the same as the case of FIG. 1.

When parallel data in the data link layer is generated from the packet arrangement 211 received in the physical layer, 4 bytes of stp token are removed from each packet received. However, in a case of 16 lane configuration, the blank space generated as a result of aligning the beginning of the packet to the left is 12 bytes (4 byte×3 blanks) at most, and accordingly, the delay caused by providing this blank space cannot be compensated by removing 4 bytes of stp token. Therefore, the timing is gradually delayed when the packet allocated to 16 lanes in the physical layer is arranged in a single parallel bus of 16 byte width in the data link layer.

Packet arrangements 212 and 213 as illustrated at the right side of FIG. 2 are examples of arrangements where multiple packets received in the packet arrangement 211 are arranged as parallel data in the data link layer. The packet arrangements 212 and 213 correspond to two parallel buses (two channels) each having 16 byte width. The remaining information (information used in the data link layer) obtained by removing framing tokens stp from the packets illustrated in the packet arrangement 211 is arranged in these two channels.

In the case of 8 lane configuration illustrated in FIG. 1, a single parallel bus having 8 byte width in the data link layer is sufficient. However, in a case of 16 lane configuration illustrated in FIG. 2, 12 bytes of blank space is generated at most as described above, and accordingly, a single parallel bus having 16 byte width in the data link layer is not sufficient. More specifically, when a packet allocated to 16 lanes in the physical layer is arranged in a single parallel bus of 16 bytes in the data link layer, the timing will be gradually delayed, which makes it impossible to receive information transmitted from the transmission side. Therefore, as in the packet arrangements 212 and 213 illustrated in FIG. 2, packets are arranged in two channels each of which has 16 byte width, so that information transmitted from the transmission side can be received without any loss.

As can be understood from FIG. 2, in most of the clock cycles, there is no overlapping of packets with each other between the packet arrangement 212 and the packet arrangement 213. Packets overlap each other between two channels only when the ending of any given packet and the beginning of a subsequent packet are located in the same clock cycle. In general, in the reception side, the processing executed at the beginning of a packet and the processing executed at the ending of a packet are different. For this reason, it is not necessary to provide duplicate resources for the reception processing even when the ending of any given packet and the beginning of a subsequent packet overlap each other. However, some of the packets have a length of one clock cycle. The beginning and the ending of such one-cycle packets are received in the same clock cycle.

In a case where the ending of a preceding packet and the beginning of a subsequent packet overlap each other, and the subsequent packet is a one-cycle packet, the ending of the preceding packet and the ending of the subsequent packet may overlap in the same clock cycle. In this case, the reception side may fail to catch up with the processing unless resources for the processing executed at the packet ending are provided in duplicate.

Since the LCRC is confirmed at the ending of a packet, LCRC check is performed at the ending of the packet. Also, since the packet is confirmed to be normal at the ending of a packet, a check result of a sequence number is naturally expected to be confirmed at the ending. Also, since the length of a packet is confirmed at the ending of the packet, the length of the packet is checked at the ending. Furthermore, since the ECRC is confirmed at the ending of a packet, ECRC check is performed at the ending of the packet. As described above, the amount of processing performed at the packet ending is extremely high. Therefore, if resources for the processing executed at the packet ending are provided in duplicate, a large number of resources are redundantly provided to increase the cost.

Figure 3:
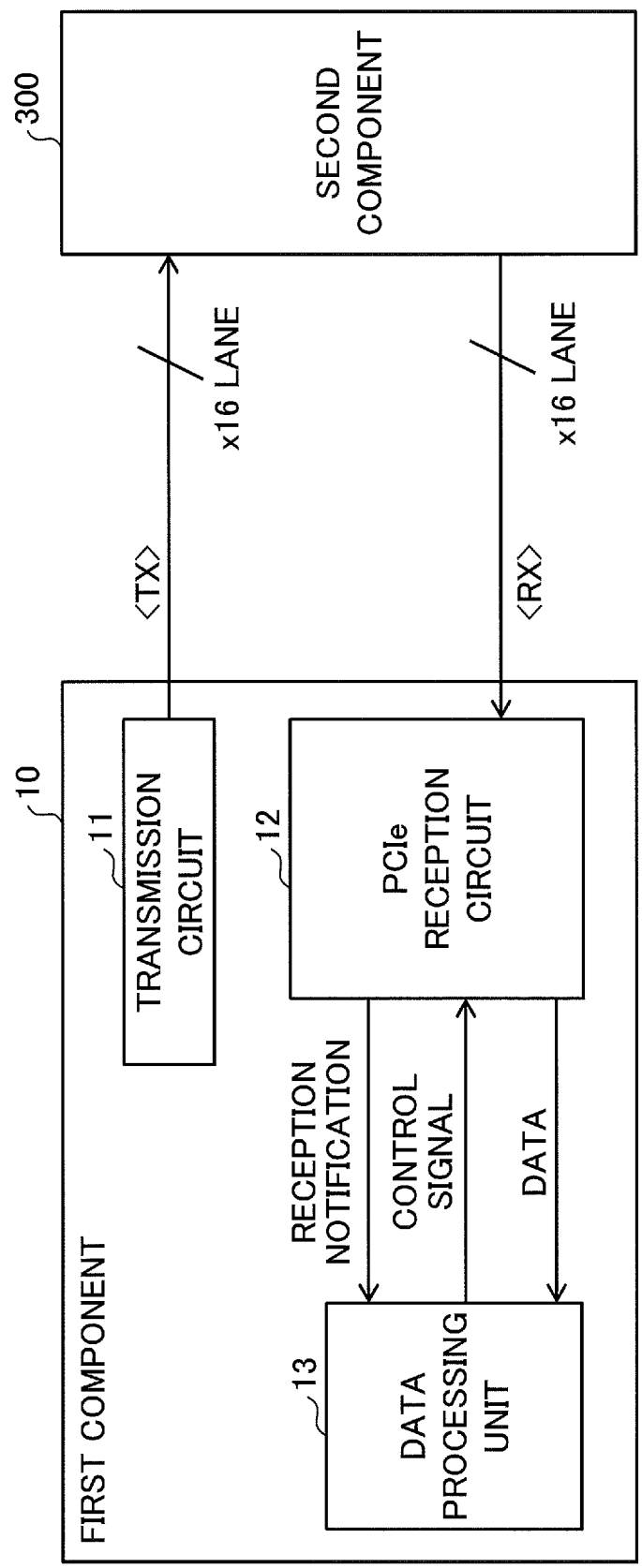
FIG. 3 is a drawing illustrating an example of configuration of a transmission and reception system of PCIe.

FIG. 3 is a drawing illustrating an example of configuration of a transmission and reception system of PCIe. In FIG. 3 and similar drawings subsequent to FIG. 3, a border between a circuit or functional block and another circuit or functional block each represented by a block basically indicates a functional border, and does not necessarily correspond to a separation of physical positions, a separation of electrical signals, a separation of control logic, and the like. Each circuit or functional block may be a hardware module that is physically separated from another block to some extent, or may indicate a function of a hardware module physically integrated with another block.

The transmission and reception system as illustrated in FIG. 3 includes a first component 10 and a second component 300, which are coupled by a link of 16 lanes. The first component 10 includes a transmission circuit 11, a PCIe reception circuit 12, and a data processing unit 13.

The transmission circuit 11 transmits information to be transmitted from the first component 10 to the second component 300. The PCIe reception circuit 12 receives information transmitted from the second component 300 to the first component 10. When the data processing unit 13 receives a reception notification from the PCIe reception circuit 12, the data processing unit 13 receives reception data from the PCIe reception circuit 12 by applying a control signal to the PCIe reception circuit 12.

Figure 4:
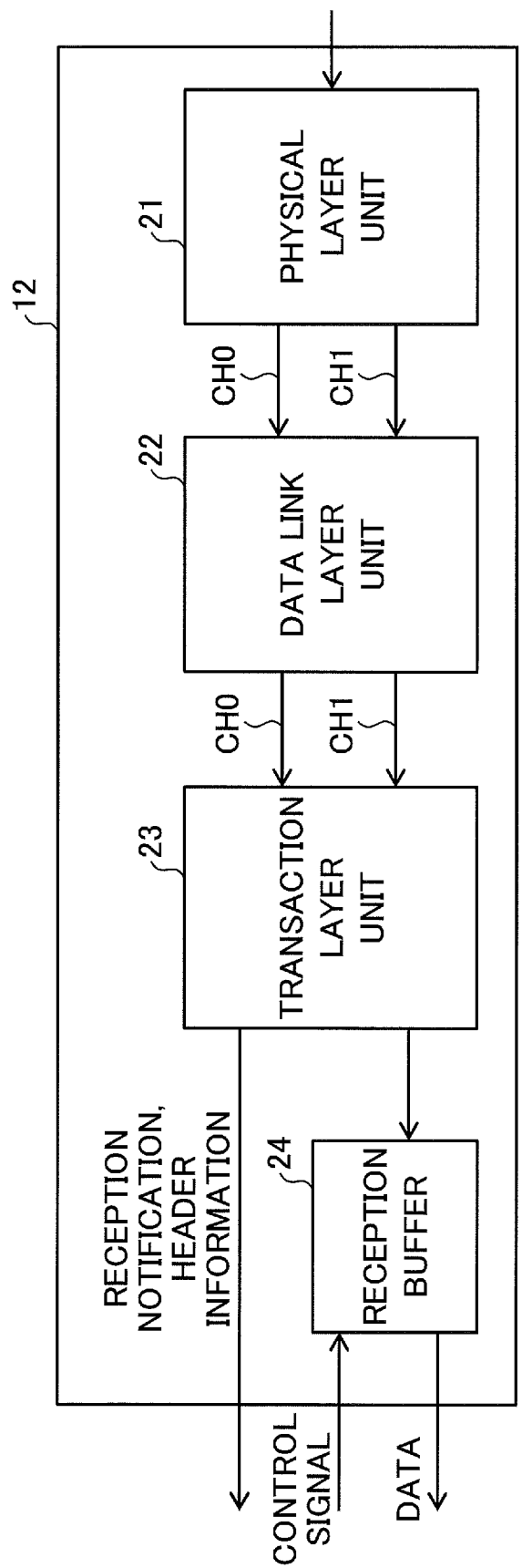
FIG. 4 is a drawing illustrating an example of configuration of a PCIe reception circuit.

FIG. 4 is a drawing illustrating an example of configuration of the PCIe reception circuit 12. The PCIe reception circuit 12 includes a physical layer unit 21, a data link layer unit 22, a transaction layer unit 23, and a reception buffer 24. The PCIe reception circuit 1.2 functions as a processing apparatus for performing various kinds of processing on received packets. The physical layer unit 21 receives packets such as a TLP and a DLLP via a link constituted by 16 lanes. The physical layer unit 21 provides, to the data link layer unit 22, information used in the data link layer (for example, a TLP having a sequence number and an LCRC attached thereto) in the reception packet, via two channels CH0 and CH1 each of which is a parallel bus of 16 bytes.

The physical layer unit 21 detects the beginning and the ending of a packet by detecting framing characters from the data received in each lane, and transmits the detected packets to the two channels CH0 and CH1. At this occasion, the physical layer unit 21 may arrange packets received from the link of 16 lanes into two channels in the data link layer 22 in a manner similar to, for example, the method of arrangement explained with reference to FIG. 2. In the example as illustrated in FIG. 4, a link having 16 lanes and two channels each having 16 byte width are assumed, but the configuration concerning the number of lanes and the width of the channel is not limited to the configuration shown in this example. The present embodiment is applicable to a configuration in which multiple channels are used when serially received packets are arranged in parallel buses, and the beginning and the ending of a packet overlap between multiple channels.

The data link layer unit 22 performs loss and duplicate reception check of packets on received TLPs on the basis of sequence numbers and checks LCRC error. The data link layer unit 22 transmits a TLP, from which the sequence number and the LCRC are removed, to the transaction layer unit 23 via two channels CH0 and CH1 each of which is a parallel bus of 16 bytes. When the data link layer unit 22 receives an ACK-DLLP, the data link layer unit 22 checks transmission completion of the TLP, and clears a retry buffer (not shown) in the data link layer (transmission side) included in the transmission circuit 11. In a case where the data link layer unit 22 (transmission side) receives a NAK-DLLP indicating occurrence of error, the data link layer unit 22 (transmission side) retransmits the TLP saved in the retry buffer.

The transaction layer unit 23 checks an ECRC error, as necessary, in the TLP received from the data link layer. Also, the transaction layer unit 23 checks the header information and integrity between the header information and the data in the TLP. When there is no error, the transaction layer unit 23 transmits information included in the header and a reception notification to the data processing unit 13 (FIG. 3) corresponding to the software layer, and stores the payload to the reception buffer 24. In a case where the reception TLP is a completion TLP, the transaction layer unit 23 collates a tag of a request TLP during request transmission and a tag of a completion TLP during response reception to perform completion check as to whether an expected response has been received. The header includes an address, a TLP type, a transfer size, a requester ID or a completer ID, a tag and the like.

Figure 5:
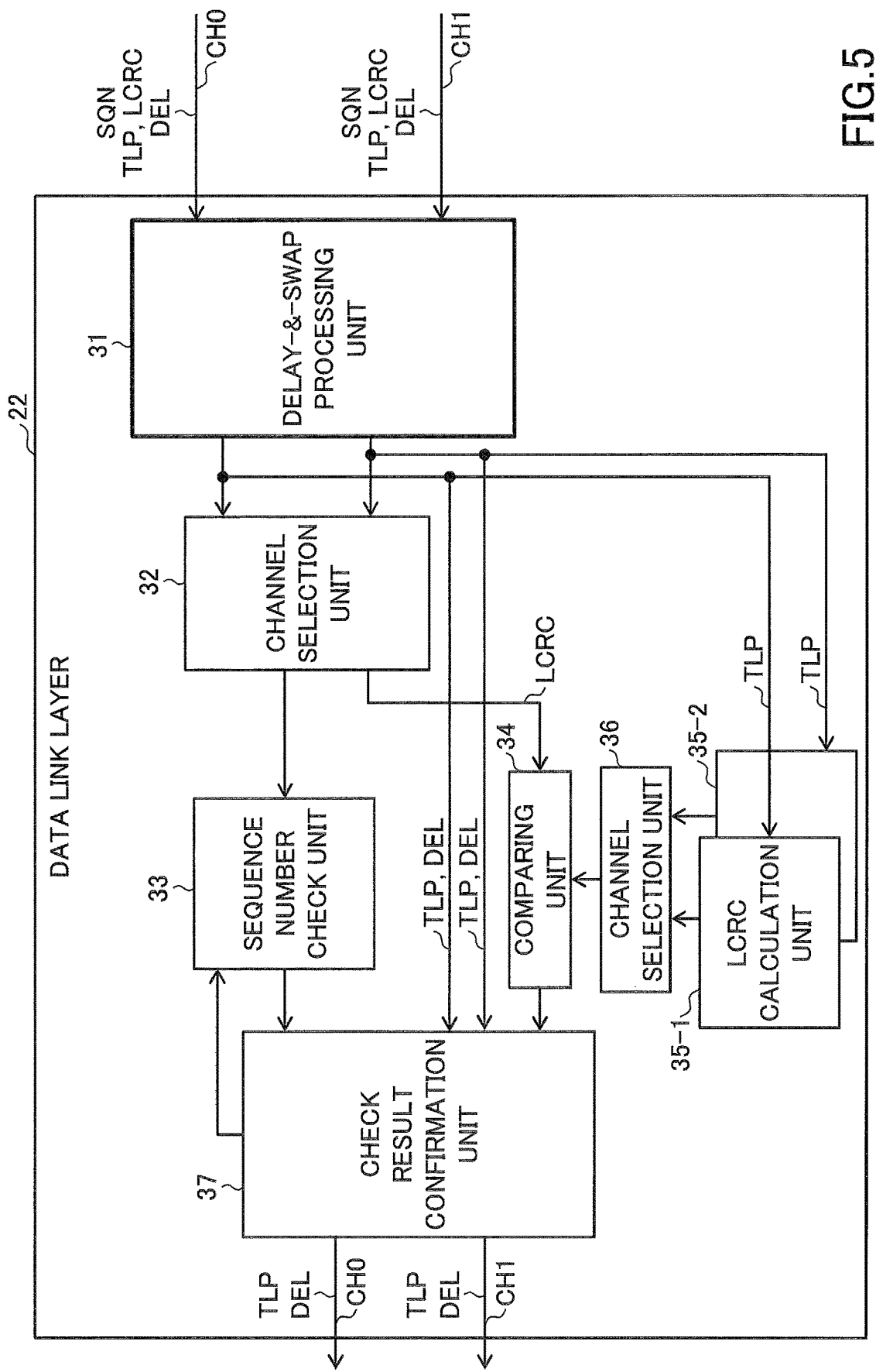
FIG. 5 is a drawing illustrating an example of configuration of a data link layer unit (reception side) provided with a delay-&-swap processing unit.

FIG. 5 is a drawing illustrating an example of configuration of the data link layer unit 22. The data link layer unit 22 as illustrated in FIG. 5 includes a delay-&-swap processing unit 31, a channel selection unit 32, a sequence number check unit 33, a comparing unit 34, LCRC calculation units 35-1 and 35-2, a channel selection unit 36, and a check result confirmation unit 37. With respect to each of channels CH0 and CH1, the data link layer unit 22 receives a sequence number SQN, a TLP, an LCRC, and (as necessary) a delete instruction DEL from the physical layer unit 21. The delete instruction DEL (EDB: EnD Bad) is an instruction transmitted to cause the second component 300 to cancel the transmission data when, e.g., an error is detected in data during transmission. This delete instruction DEL is sent in synchronization with the packet ending. Therefore, whether the packet is received and sent to a subsequent stage is determined at the ending.

In order to enable overlapping packet processing between two channels while suppressing the cost of packet reception processing resources in downstream stages, the delay-&-swap processing unit 31 delays the data timing of one of the channels, and as necessary, performs data swap between two channels. This delay-&-swap processing will be explained later.

As explained with reference to FIG. 2, a situation where packets overlap between two channels is only when the ending of any given packet and the beginning of a subsequent packet overlap in the same clock cycle. Further, in a case where the subsequent packet is a one-cycle packet, the endings of packets overlap between two channels. It should be noted that the beginnings of packets do not overlap between two channels. In other words, in a situation where the ending of the preceding packet and the beginning of the subsequent packet overlap, the preceding packet is a packet having multi-cycle length.

The delay-&-swap processing unit 31 executes processing for solving the state where the endings of packets overlap between two channels. In other words, in two channels that are output from the delay-&-swap processing unit 31, the timings of the ending of a packet in any given channel and the ending of another packet in the other channel are adjusted so as not to overlap. Furthermore, the beginnings of packets do not overlap each other between two channels, either. However, even though the beginnings do not overlap each other, and the endings do not overlap each other, there is a state in which the beginning and the ending overlap each other.

Since the delay-&-swap processing unit 31 is provided, the packet processing units (transaction layer unit 23 and the like) that process packets in stages downstream of the delay-&-swap processing unit 31 in the PCIe reception circuit 12 do not have to process packets of which endings overlap each other between two channels. Therefore, packets overlapping between two channels can be processed while avoiding duplication of the processing resources and the complication of processing in the packet processing unit.

When the channel selection unit 32 detects the beginning of a packet in any one of two channels that are output from the delay-&-swap processing unit 31, the channel selection unit 32 transmits a sequence number SQN of the packet to the sequence number check unit 33. Further, when the channel selection unit 32 detects the ending of a packet in any one of two channels that are output from the delay-&-swap processing unit 31, the channel selection unit 32 transmits the LCRC of the packet to the comparing unit 34.

The sequence number check unit 33 checks as to whether there is any loss in reception of a packet, as to whether packets are received in duplicate, and the like, by comparing the currently held sequence number and the currently received sequence number. The sequence number held by the sequence number check unit 33 is increased by one every time a packet is normally received at the timing of packet ending according to the instruction from the check result confirmation unit 37.

The comparing unit 34 compares the LCRC received from the channel selection unit 32 and the LCRC calculation value received from the channel selection unit 36, and notifies the comparison result to the check result confirmation unit 37. The LCRC calculation value that is output from the channel selection unit 36 is calculated by LCRC calculation units 35-1 and 35-2. Since the LCRC calculation units 35-1 and 35-2 successively calculate CRC of each byte constituting a packet (alternatively, data portion of multi-byte length), the LCRC calculations are executed in parallel in both of the channels. In the output of the delay-&-swap processing unit 31, overlapping of packets between both channels is not completely solved, and therefore, the LCRC calculation units 35-1 and 35-2 are provided in parallel. The channel selection unit 36 selects and outputs an LCRC calculation value for the channel to be compared.

The check result confirmation unit 37 checks whether there is any LCRC error on the basis of the comparison result from the comparing unit 34. In a case where the comparison result from the comparing unit 34 indicates matching of LCRC, the check result confirmation unit 37 determines that there is no LCRC error. In a case where there is no problem in the sequence number check, there is no problem in the LCRC check, and the packet delete instruction DEL is not received, then, the check result confirmation unit 37 instructs an increment of the sequence number, and outputs the TLP, which is provided from the delay-&-swap processing unit 31 and from which the LCRC is removed, and the delete instruction DEL without changing the value thereof. When there is an error, the delete instruction DEL becomes a value indicating delete. These confirmation processing and output processing are independently executed for the two channels CH0 and CH1.

In the data link layer unit 22, the delay-&-swap processing unit 31 is provided, so that the packet endings do not overlap between two channels. If packet endings overlap, not only the LCRC calculation units 35-1 and 35-2 but also the comparing unit 34 are required to be provided in duplicate. Furthermore, the sequence number update processing in the sequence number check unit 33 becomes more complicated. For example, in a case where two endings are simultaneously received in the same clock cycle, it is required to, as a control different from normal, increase the sequence number by two instead of by one in the update processing of the sequence number. Likewise, in the transaction layer unit 23 in the downstream stage, it is required to provide duplicate processing resources and complicate the processing. As in the configuration of FIG. 5, the delay-&-swap processing unit 31 allows packets overlapping between two channels to be processed while avoiding duplication of the processing resources and complication of the processing in the packet processing unit in the data link layer unit 22 and subsequent stages.

Figure 6:
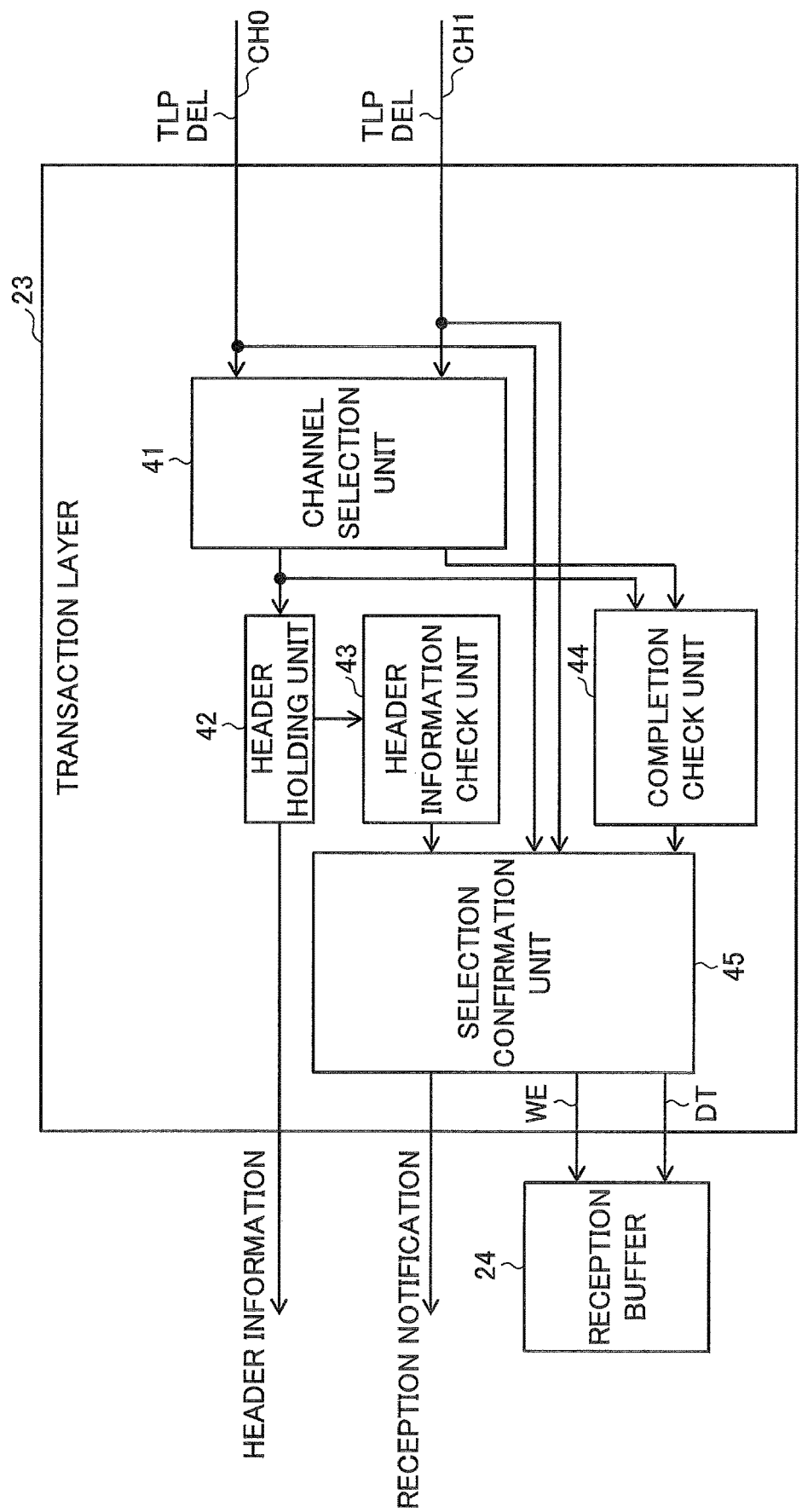
FIG. 6 is a drawing illustrating an example of configuration of a transaction layer unit (reception side)

FIG. 6 is a drawing illustrating an example of configuration of the transaction layer unit 23. The transaction layer unit 23 as illustrated in FIG. 6 includes a channel selection unit 41, a header holding unit 42, a header information check unit 43, a completion check unit 44, and a selection confirmation unit 45. With respect to each of the channels CH0 and CH1, the transaction layer unit 23 receives a TLP and (as necessary) a delete instruction DEL from the data link layer unit 22.

When the channel selection unit 41 detects the beginning of a packet in any one of the two channels that are output from the delay-&-swap processing unit 31, the channel selection unit 41 transmits the header of the packet to the header holding unit 42 and the completion check unit 44. Further, when the channel selection unit 41 detects the ending of a packet in any one of the two channels that are output from the delay-&-swap processing unit 31, the channel selection unit 41 transmits information about the ending to the completion check unit 44.

The header information check unit 43 performs various kinds of checks on the basis of information about the header held in the header holding unit 42. In a case where the reception packet is a completion for read request, the completion check unit 44 performs correspondence confirmation between the transmitted request and the received completion. The header information includes a header length, format information indicating whether data is included or not, type information indicating a request type, packet length information and the like. In a case where a reception packet is a completion for read request, completion status information and the like are also included in the header. An error is reported in a case where there is inconsistency, e.g., a case where correspondence cannot be obtained between the reception packet and the request, a case where the packet length information is different from the actual packet length, a case where a combination between the completion status information and the format information involves a problem, and the like. Also, in a case where the request type is not supported, an error to that effect is reported. The error report is transmitted from the header information check unit 43 or the completion check unit 44 to the selection confirmation unit 45.

In a case where there is no problem in the check result, the selection confirmation unit 45 transmits a reception notification in synchronization with one of channels in which ending of a packet is detected. Further, the selection confirmation unit 45 attaches a write instruction WE to the reception buffer 24, and writes the payload DT of the TLP received from the data link layer unit 22 to the reception buffer 24.

If the delay-&-swap processing unit 31 is not provided in FIG. 5, the header holding unit 42, the header information check unit 43, the completion check unit 44, and the selection confirmation unit 45 are required to be duplicated in the transaction layer unit 23 of FIG. 6. As in the configuration illustrated in FIG. 5, the delay-&-swap processing unit 31 provided in the data link layer unit 22 allows packets overlapping between two channels to be processed while avoiding duplication of the processing resources and complication of the processing in the transaction layer unit 23.

In the configuration explained above, the delay-&-swap processing unit 31 is provided in the data link layer unit 22, but the position where the delay-&-swap processing unit is provided may be in the transaction layer unit 23. Hereinafter, the configuration in which a delay-&-swap processing unit 31 is provided in a transaction layer unit 23A will be explained.

Figure 7:
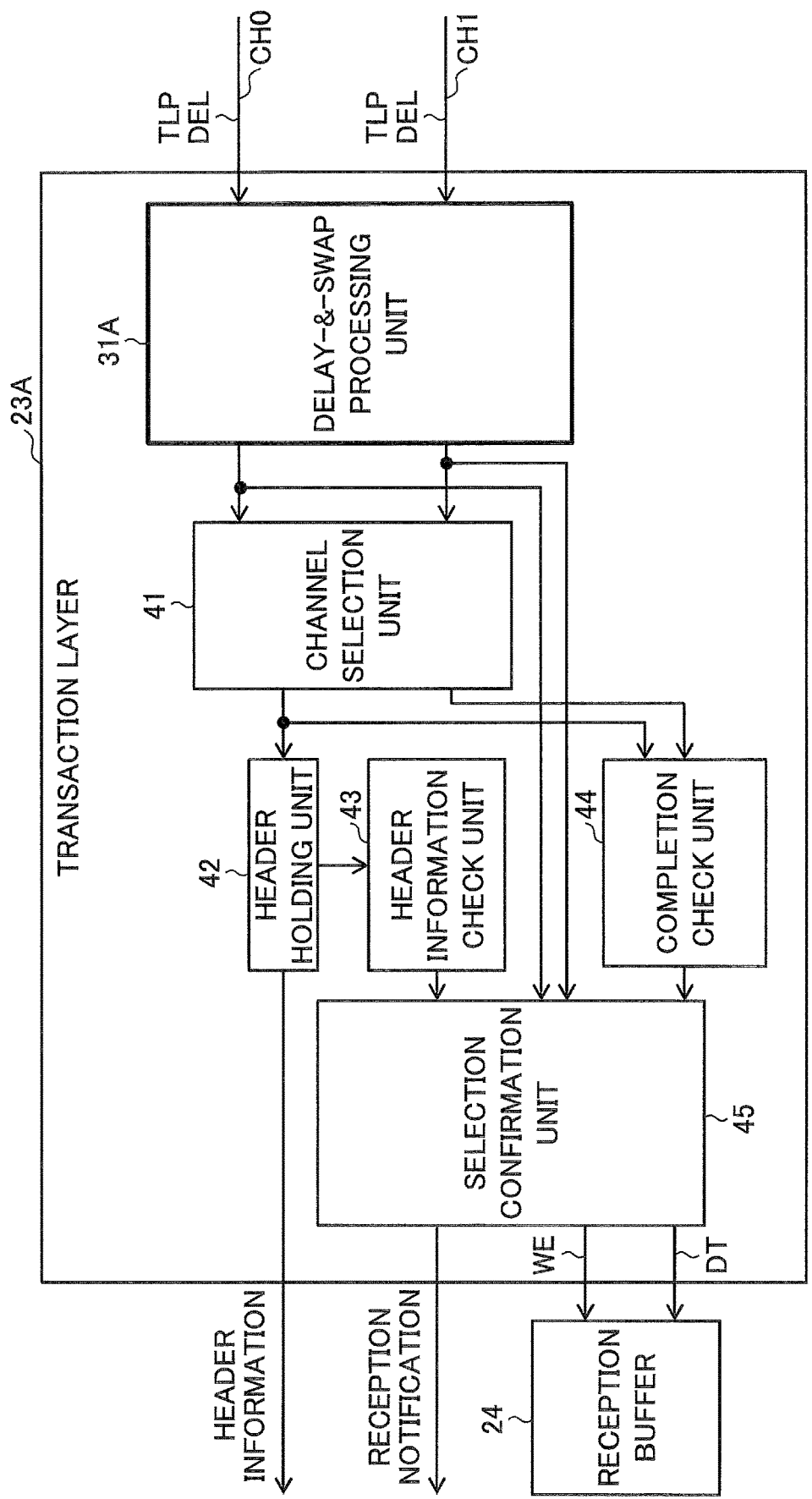
FIG. 7 is a drawing illustrating an example of configuration of a transaction layer unit (reception side) provided with a delay-&-swap processing unit.

FIG. 7 is a drawing illustrating an example of configuration of the transaction layer unit 23A provided with the delay-&-swap processing unit 31A. The transaction layer unit 23A as illustrated in FIG. 7 includes a delay-&-swap processing unit 31A, a header holding unit 42, a header information check unit 43, a completion check unit 44, and a selection confirmation unit 45. With respect to each of the channels CH0 and CH1, the transaction layer unit 23A receives the TLP and (as necessary) a delete instruction DEL from the data link layer unit 22.

In order to enable overlapping packet processing between two channels while suppressing the cost of packet reception processing resources in downstream stages, the delay-&-swap processing unit 31A delays the data timing of one of the channels, and as necessary, performs data swap between two channels. The configuration and operation of the delay-&-swap processing unit 31A are the same as the configuration and operation of the delay-&-swap processing unit 31 explained above. In two channels that are output from the delay-&-swap processing unit 31A, the timings of the ending of a packet in any given channel and the ending of another packet in the other channel are adjusted so as not to overlap. The beginnings of packets do not overlap each other between two channels, either. However, even though the beginnings do not overlap each other, and the endings do not overlap each other, there is a state in which the beginning and the ending overlap each other. The configurations and operations of the header holding unit 42, the header information check unit 43, the completion check unit 44, and the selection confirmation unit 45 illustrated in FIG. 7 may be the same as the configurations and operations of the corresponding units illustrated in FIG. 6.

If the delay-&-swap processing unit 31A were not provided, the header holding unit 42, the header information check unit 43, the completion check unit 44, and the selection confirmation unit 45 would be required to be duplicated. The delay-&-swap processing unit 31A provided in the transaction layer unit 23A in the configuration illustrated in FIG. 7 allows packets overlapping between two channels to be processed while avoiding duplication of the processing resources and complication of the processing.

Figure 8:
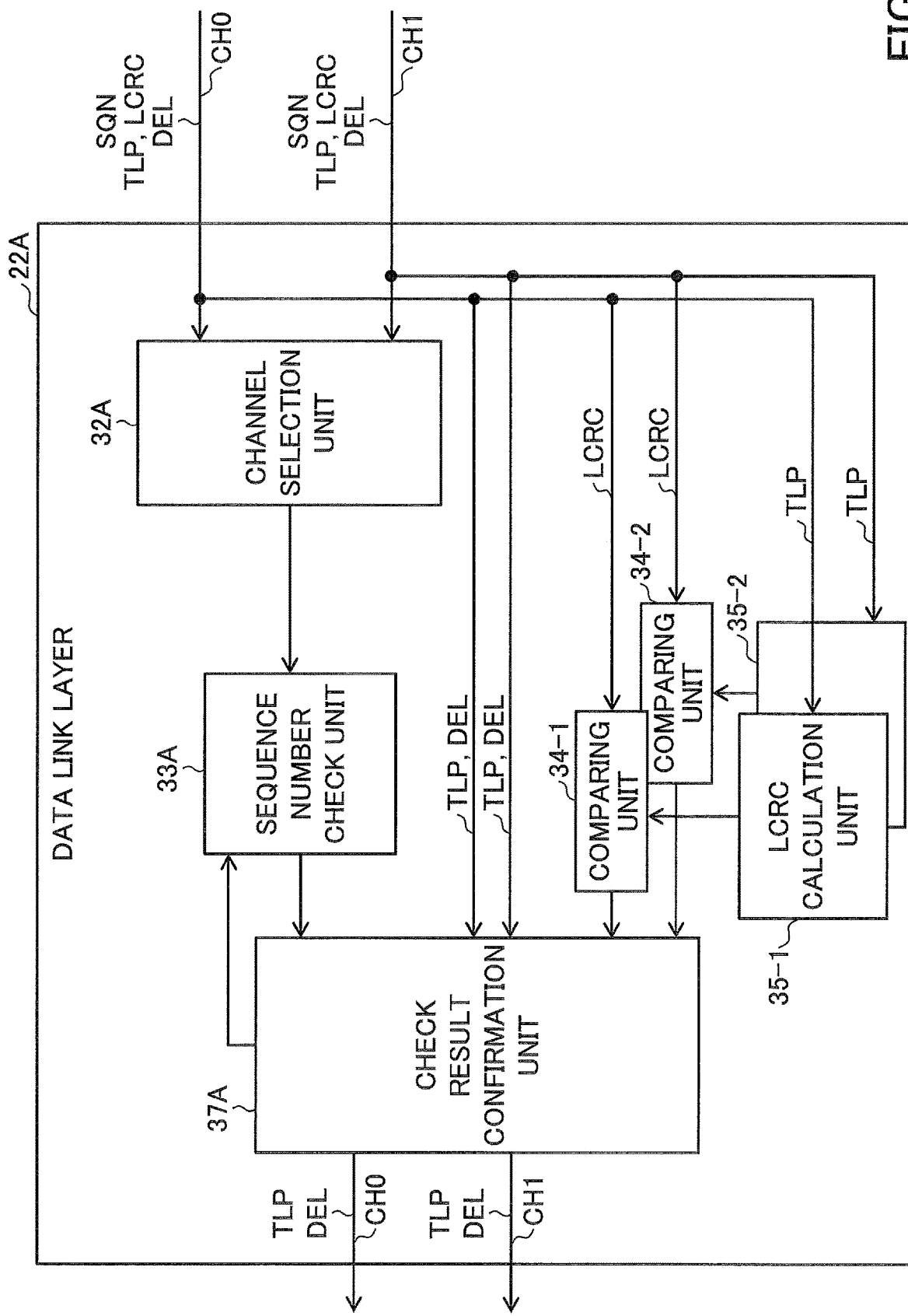
FIG. 8 is a drawing illustrating an example of configuration of a data link layer unit (reception side) in a case where the delay-&-swap processing unit is provided in the transaction layer unit (reception side)

FIG. 8 is a drawing illustrating an example of configuration of a data link layer unit 22A in a case where the delay-&-swap processing unit 31A is provided in the transaction layer unit 23A. The data link layer unit 22A illustrated in FIG. 8 includes a channel selection unit 32A, a sequence number check unit 33A, comparing units 34-1 and 34-2, LCRC calculation units 35-1 and 35-2, and a check result confirmation unit 37A.

In the data link layer unit 22A illustrated in FIG. 8, the delay-&-swap processing unit 31 illustrated in FIG. 5 is not provided, and therefore, a state in which packet endings overlap between two channels occurs. When packet endings overlap, not only the LCRC calculation units 35-1 and 35-2 but also the comparing units 34-1 and 34-2 are required to be provided in duplicate. In the configuration illustrated in FIG. 8, the comparing units 34-1 and 34-2 are provided in parallel.

When the channel selection unit 32A detects the beginning of a reception packet, the channel selection unit 32A transmits the sequence number SQN of the packet to the sequence number check unit 33A. The sequence number check unit 33A checks as to whether there is any loss in reception of a packet, as to whether packets are received in duplicate, and the like, by comparing the currently held sequence number and the currently received sequence number. The sequence number held by the sequence number check unit 33A is updated to a number increased by one at the timing of packet ending according to the instruction from the check result confirmation unit 37A. However, in a case where endings of reception packets are simultaneously detected in two channels, a control different from normal is executed, and the sequence number check unit 33A increases the held sequence number by two, not by one, during updating.

The comparing units 34-1 and 34-2 are provided to correspond to the two channels CH0 and CH1, respectively. Each of the comparing units 34-1 and 34-2 compares the LCRC included in the reception packet in the corresponding channel and the LCRC calculation value received from a corresponding one of the LCRC calculation units 35-1 and 35-2, and notifies the comparison result to the check result confirmation unit 37A. The check result confirmation unit 37A confirms presence or absence of LCRC error in the corresponding channel on the basis of the comparison result from the comparing unit 34-1 or 34-2. In a case where the comparison result from the comparing unit 34-1 or 34-2 indicates matching of the LCRC, the check result confirmation unit 37A determines that there is no LCRC error in the corresponding channel. In a case where there is no problem in the sequence number check, there is no problem in the LCRC check, and the packet delete instruction DEL is not received, then, the check result confirmation unit 37A outputs the TLP, which is provided from the physical layer unit 21 and from which the LCRC is removed, and the delete instruction DEL without changing the value thereof. The comparison processing, the confirmation processing, and the output processing are independently executed for the two channels CH0 and CH1.

The delay processing and swap processing executed by the delay-&-swap processing unit 31 will be hereinafter explained. As explained with reference to FIG. 2, packets overlap each other between two channels only when the ending of any given packet and the beginning of a subsequent packet are located in the same clock cycle. In a case where the ending of a preceding packet and the beginning of a subsequent packet overlap each other, and the subsequent packet is a one-cycle packet, then, the ending of the preceding packet and the ending of the subsequent packet overlap in the same clock cycle. In this case, the reception side may fail to catch up with the processing unless resources for the processing executed at the packet ending are provided in duplicate.

In a case where the ending of a first packet of multi-cycle length and the ending of a second packet of one-cycle length overlap at the input side of two channels, the delay-&-swap processing unit 31 starts a state in which data is delayed by one cycle at the output side of the channel from which the second packet is received. As a result, the state in which the ending of the preceding packet and the ending of the subsequent packet overlap in the same clock cycle can be solved at the output side.

When a cycle occurs in which there is no packet in any of the channels at the input side of the channels during the delay state in which any one of the channels is delayed by one cycle at the output side of the channels, the delay-&-swap processing unit 31 terminates the delay state of the channel. As a result, the delay state can be terminated, and the original timing can be recovered. If an event of overlapping of packet endings occurs again during the state in which the delay state is continuing, this will result in increase of the amount of delay on every such event. Therefore, it is preferable to terminate the delay state without losing an appropriate chance.

FIGS. 9A and 9B are timing charts illustrating a first example of delay-&-swap processing. FIG. 9A illustrates packets in two channels CH0 and CH1 that are input into the delay-&-swap processing unit 31. FIG. 9B illustrates packets in two channels CH0 and CH1 that are output from the delay-&-swap processing unit 31.

In the example illustrated in FIG. 9A, in a cycle T1, the ending of a packet 51 of multi-cycle length in the first channel CH0 and the ending of a packet 52 of one-cycle length in the second channel CH1 overlap. The delay-&-swap processing unit 31 starts, from this cycle T1, a state in which data in the second channel CH1 for the packet 52 is delayed by one cycle. As a result, as illustrated in FIG. 9B, the packet 52 of one-cycle length is delayed by one cycle and transferred from the cycle T1 to the cycle T2.

As illustrated in FIG. 9A, a cycle in which no packet exists in any one of the channels at the input side occurs in the cycle T2. As illustrated in FIG. 9B, when this cycle T2 comes during the state in which the second channel CH1 is delayed, the delay state of the second channel CH1 is terminated in the cycle T2.

Figure 10A:
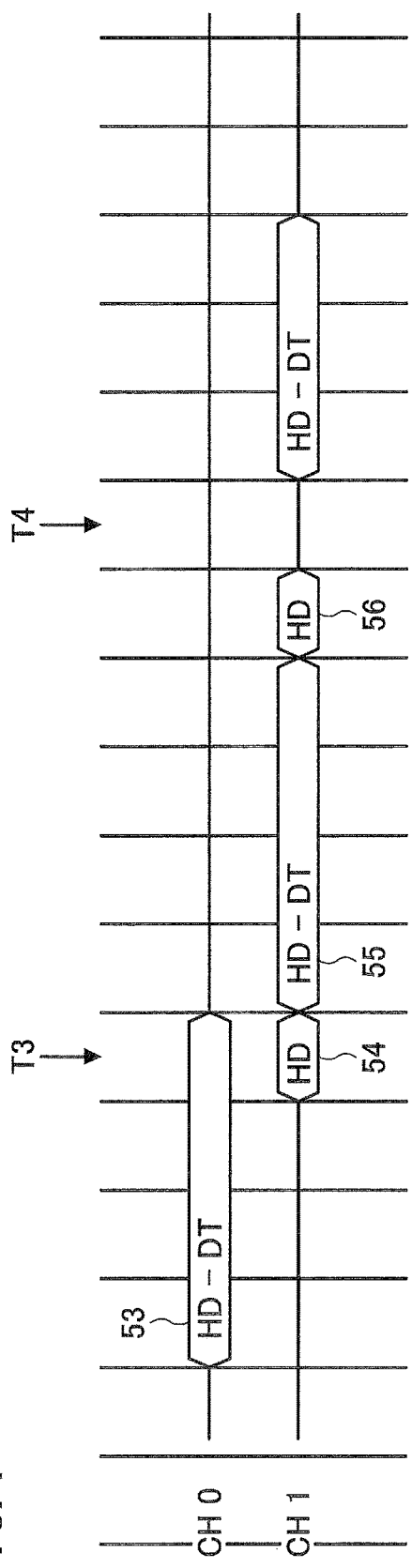
FIGS. 10A and 10B are timing charts illustrating a second example of delay-&-swap processing.
Figure 10B:
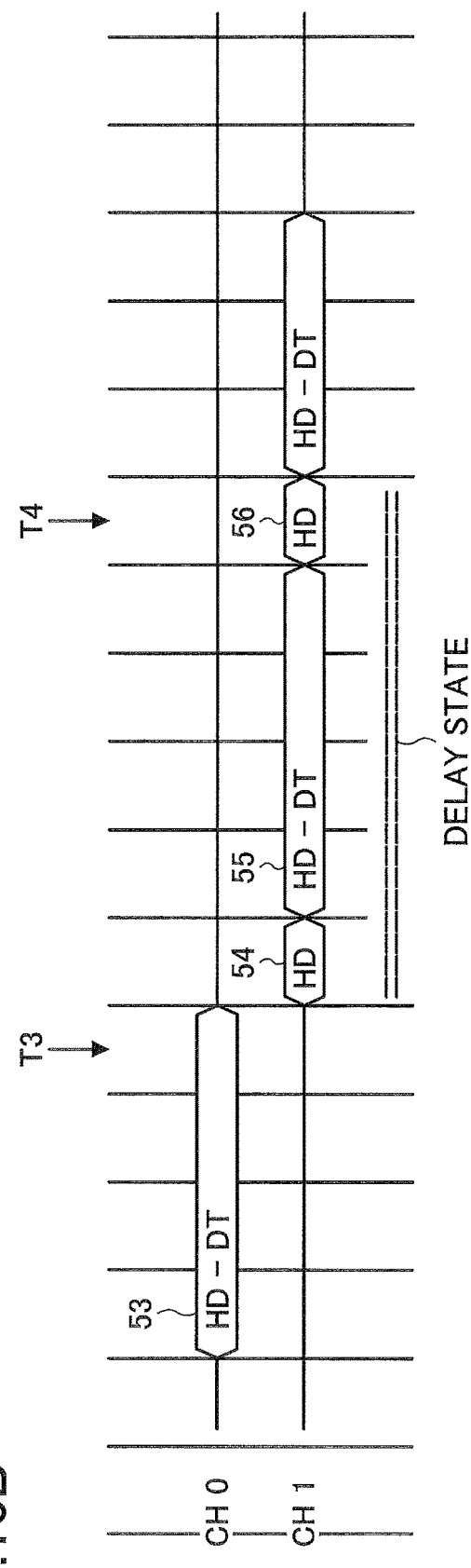

FIGS. 10A and 10B are timing charts illustrating a second example of delay-&-swap processing. FIG. 10A illustrates packets in the two channels CH0 and CH1 that are input into the delay-&-swap processing unit 31. FIG. 10B illustrates packets in the two channels CH0 and CH1 that are output from the delay-&-swap processing unit 31.

In the example illustrated in FIG. 10A, in a cycle T3, the ending of a packet 53 of multi-cycle length in the first channel CH0 and the ending of a packet 54 of one-cycle length in the second channel CH1 overlap. The delay-&-swap processing unit 31 starts, from this cycle T3, a state in which data in the second channel CH1 for the packet 54 is delayed by one cycle. As a result, as illustrated in FIG. 10B, the packet 54 of one-cycle length, a packet 55 of multi-cycle length, and a packet 56 of one-cycle length subsequent thereto are delayed by one cycle.

As illustrated in FIG. 10A, a cycle in which no packet exists in any one of the channels occurs in the cycle T4. As illustrated in FIG. 10B, when this cycle T4 comes during the state in which the second channel CH1 is delayed, the delay state of the second channel CH1 is terminated in the cycle T4.

Furthermore, as yet another control operation, the delay-&-swap processing unit 31 executes the following operation. When the ending of a third packet of multi-cycle length and the beginning of a fourth packet of multi-cycle length are continuous at the input side in any given channel in the delay state, the delay-&-swap processing unit 31 terminates the delay state of the channel, and starts data swap between the channels at the output side. As described above, through data swap for passing the fourth packet to the channel where there is a vacancy, the delay state can be terminated, and the original timing can be recovered while the fourth packet is maintained in a non-delayed state at the output side. Upon detecting an absence of a condition that an ending of a fifth packet of multi-cycle length and the beginning of another multi-cycle length packet overlaps between channels at the input side, the data swap between the channels is terminated at the occurrence of the single ending. Accordingly, at appropriate timing, the data swap between the channels can be terminated, and the original timing can be recovered. The term "single ending" means an ending of any given packet which does not overlap another packet in another channel in the cycle in which the ending of the packet is present.

FIGS. 11A and 11B are timing charts illustrating a third example of delay-&-swap processing. FIG. 11A illustrates packets in the two channels CH0 and CH1 that are input into the delay-&-swap processing unit 31. FIG. 11 illustrates packets in the two channels CH0 and CH1 that are output from the delay-&-swap processing unit 31.

In the example illustrated in FIG. 1A, in the cycle T5, the ending of a packet 57 of multi-cycle length in the first channel CH0 and the ending of a packet 58 of one-cycle length in the second channel CH1 overlap. The delay-&-swap processing unit 31 starts, from this cycle T5, a state in which data in the second channel CH1 for the packet 58 is delayed by one cycle. As a result, as illustrated in FIG. 11B, a packet 58 of one-cycle length and a packet 59 of multi-cycle length subsequent thereto are delayed by one cycle.

As illustrated in FIG. 11A, in the cycle T6, the ending of the packet 59 of multi-cycle length and the beginning of a packet 60 of multi-cycle length are continuous at the input side. It should be noted that the packet 59 is an example of the third packet, and the packet 60 is an example of the fourth packet and the fifth packet. As illustrated in FIG. 11B, when this cycle T6 comes during the state in which the second channel CH1 is delayed, the delay state of the second channel CH1 is terminated, and data swap between the channels is started. As a result of data swap between the channels, the packet 60 is moved from the second channel CH1 to the first channel CH0 without any delay from the original timing. Also the delay state in the second channel CH1 is terminated. In a case where a condition that the ending of the multi-cycle length packet 60 and the beginning of another multi-cycle length packet overlaps at the input side is satisfied, this data swap between the channels continues. On the other hand, in a case where the above condition is not satisfied, the data swap between the channels is terminated upon such single ending. As described above, the delay state in the second channel CH1 can be terminated, and the original timing can be recovered while the packet 60 is maintained in a non-delayed state.

FIGS. 12A and 12B are timing charts illustrating a fourth example of delay-&-swap processing. FIG. 12A illustrates packets in the two channels CH0 and CH1 that are input into the delay-&-swap processing unit 31. FIG. 12B illustrates packets in the two channels CH0 and CH1 that are output from the delay-&-swap processing unit 31.

In the example illustrated in FIG. 12A, in the cycle T7, the ending of a packet 61 of multi-cycle length in the first channel CH0 and the ending of a packet 62 of one-cycle length in the second channel CH1 overlap. The delay-&-swap processing unit 31 starts, from this cycle T7, a state in which data in the second channel CH1 for the packet 62 is delayed by one cycle. As a result, as illustrated in FIG. 12B, the packet 62 of one-cycle length and a packet 63 of multi-cycle length subsequent thereto are delayed by one cycle.

In the cycle T9 of FIG. 12A, the ending of a packet 64 of multi-cycle length in the second channel CH1 and the ending of a packet 65 of one-cycle length in the first channel CH0 overlap. The delay-&-swap processing unit 31 starts, from this cycle T9, a state in which data in the first channel CH0 for the packet 65 is delayed by one cycle. As a result, as illustrated in FIG. 12B, the packet 65 of one-cycle length is delayed by one cycle.

As illustrated in FIG. 12A, in the cycle T8, the ending of the packet 63 of multi-cycle length and the beginning of the packet 64 of multi-cycle length are continuous at the input side. As illustrated in FIG. 12B, when this cycle T8 comes during the state in which the second channel CH1 is delayed, the delay state of the second channel CH1 is terminated, and data swap between the channels is started. As a result of data swap between the channels, the packet 64 is moved from the second channel CH1 to the first channel CH0 without any delay from the original timing. Also the delay state in the second channel CH1 is terminated. Since the ending of the multi-cycle length packet 64 and the beginning of another multi-cycle length packet do not overlap at the input side, the data swap between the channels is terminated upon occurrence of the single ending. As described above, the delay state in the second channel CH1 can be terminated, and the original timing can be recovered while the packet 64 is maintained in a non-delayed state.

As illustrated in FIG. 12A, a cycle in which no packet exists in any one of the channels at the input side occurs in the cycle T10. As illustrated in FIG. 12B, when this cycle T10 comes during the state in which the first channel CH0 is delayed, the delay state of the first channel CH0 is terminated in the cycle T10.

Figure 13A:
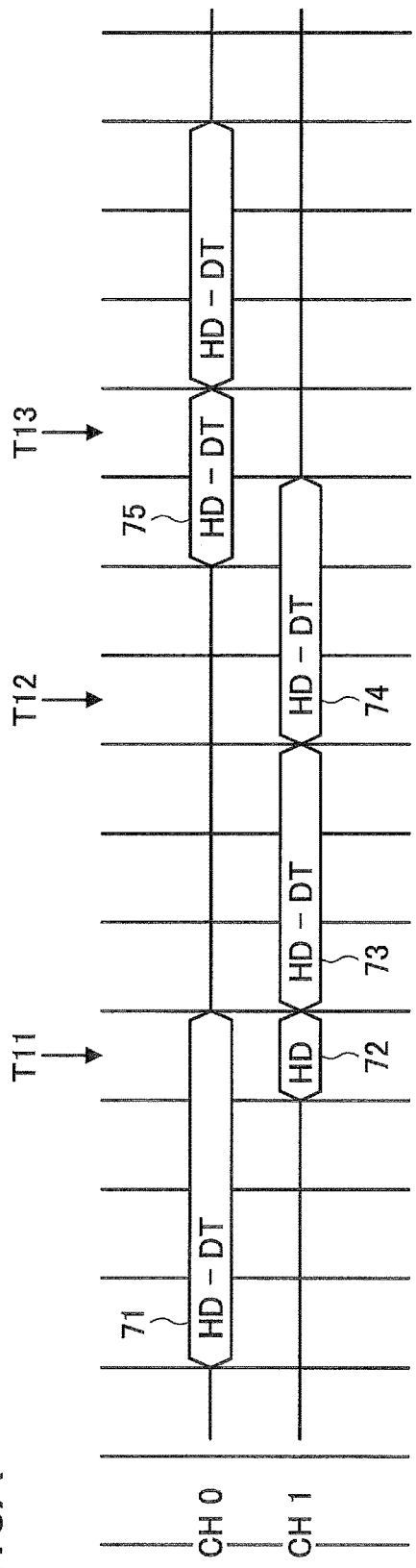
FIGS. 13A and 13B are timing charts illustrating a fifth example of delay-&-swap processing.
Figure 13B:
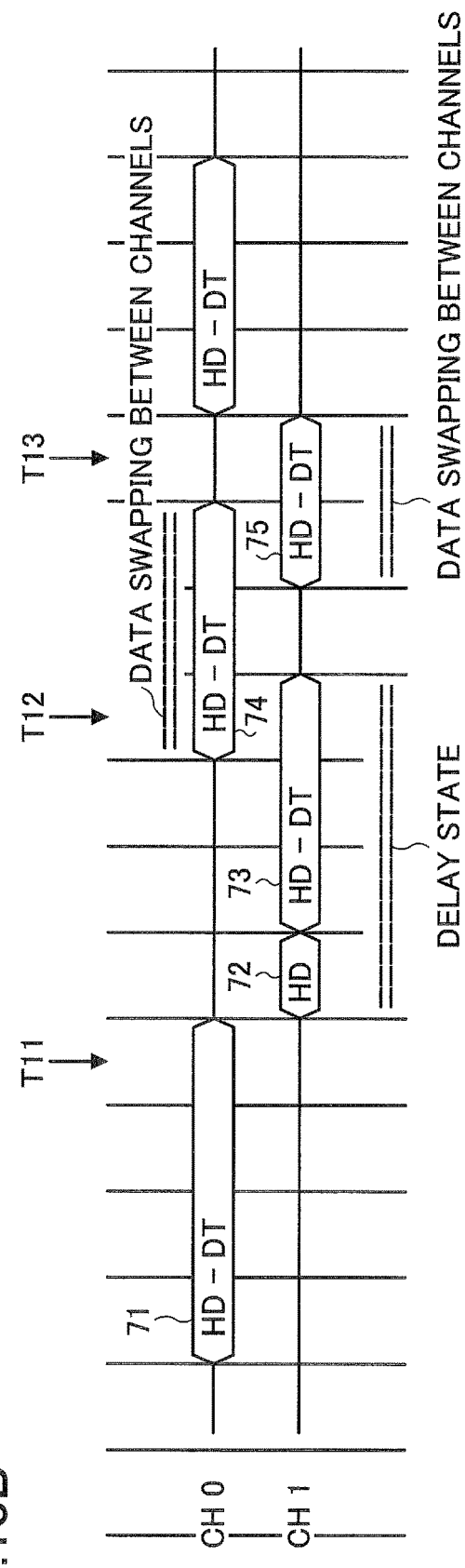

FIGS. 13A and 13B are timing charts illustrating a fifth example of delay-&-swap processing. FIG. 13A illustrates packets in the two channels CH0 and CH1 that are input into the delay-&-swap processing unit 31. FIG. 13B illustrates packets in the two channels CH0 and CH1 that are output from the delay-&-swap processing unit 31.

In the example illustrated in FIG. 13A, in the cycle T11, the ending of a packet 71 of multi-cycle length in the first channel CH0 and the ending of a packet 72 of one-cycle length in the second channel CH1 overlap. The delay-&-swap processing unit 31 starts, from this cycle T11, a state in which data in the second channel CH1 for the packet 72 is delayed by one cycle. As a result, as illustrated in FIG. 13B, the packet 72 of one-cycle length and the packet 73 of multi-cycle length subsequent thereto are delayed by one cycle.

As illustrated in FIG. 13A, in the cycle T12, the ending of the packet 73 of multi-cycle length and the beginning of a packet 74 of multi-cycle length are continuous at the input side. As illustrated in FIG. 13B, when this cycle T12 comes during the state in which the second channel CH1 is delayed, the delay state of the second channel CH1 is terminated, and data swap between the channels is started. As a result of data swap between the channels, the packet 74 is moved from the second channel CH1 to the first channel CH0 without any delay from the original timing. Also the delay state in the second channel CH1 is terminated.

Since the ending of the packet 74 and the beginning of the multi-cycle length packet 75 overlap at the input side, the data swap between the channels is continued without being terminated at the ending of the packet 74. As a result of data swap between the channels, the packet 75 is moved from the first channel CH0 to the second channel CH1 without any delay from the original timing.

Since the ending of the multi-cycle length packet 75 and the beginning of a subsequent multi-cycle length packet do not overlap at the input side, the data swap between the channels is terminated upon the single ending in the cycle T13. As described above, the delay state in the second channel CH1 can be terminated, and the original timing can be recovered while the packets 74 and 75 are maintained in a non-delayed state.

As hereinabove explained with reference to the example illustrated in FIGS. 9A and 9B to FIGS. 13A and 13B, the delay-&-swap processing unit 31 executes processing for solving overlapping of packet endings between two channels. This processing can be implemented by controlling of delay of packet data and swapping between channels with commands synchronized with packets and a logic circuit.

Figure 14:
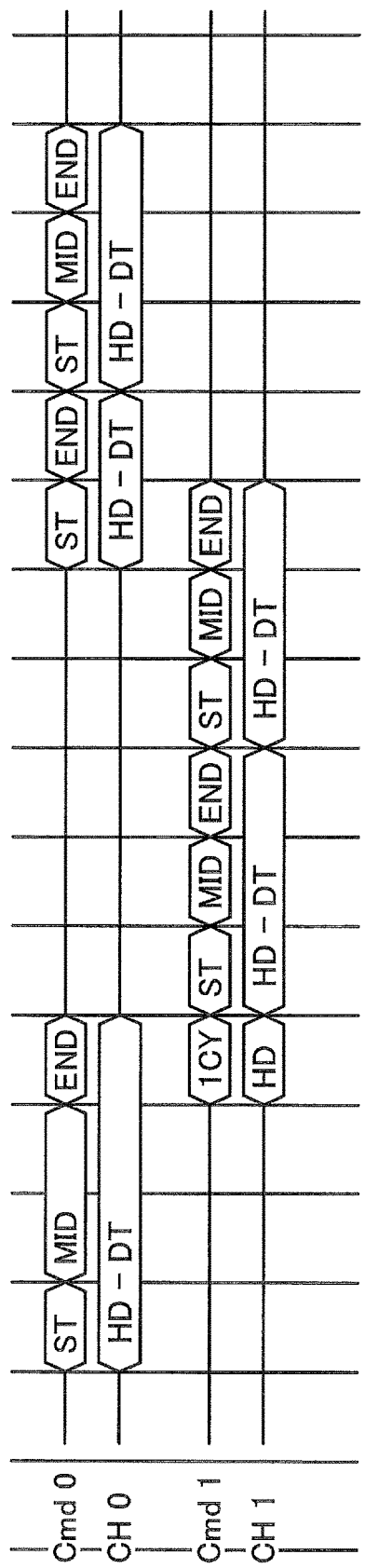
FIG. 14 is a drawing illustrating an example of commands synchronized with packets.

FIG. 14 is a drawing illustrating an example of commands synchronized with packets. A command Cmd0 is provided in synchronization with packets in the first channel CH0. A command Cmd1 is provided in synchronization with packets in the second channel CH1. The temporal change of packets and commands illustrated in FIG. 14 corresponds to temporal change of packets illustrated in FIG. 13A.

A command "ST" indicates a beginning cycle (i.e., first-cycle) of a multi-cycle length packet. A command "MID" indicates an intermediate cycle (i.e., from the second cycle to a cycle before the ending cycle) of the multi-cycle length packet. A command "END" indicates an ending cycle of the multi-cycle length packet. A command "1CY" indicates a cycle in which the one-cycle length packet is arranged. These commands may be provided from the physical layer unit 21 to the data link layer unit 22 in synchronization with packets such as a TLP, a DLLP, and the like. More specifically, the physical layer unit 21 may generate these commands when the packets are arranged in two channels, and transmit the commands in synchronization with packet data in each channel. In other words, the command Cmd0 is transmitted in synchronization with the first channel CH0, and the command Cmd1 is transmitted in synchronization with the channel CH1.

Figure 15:
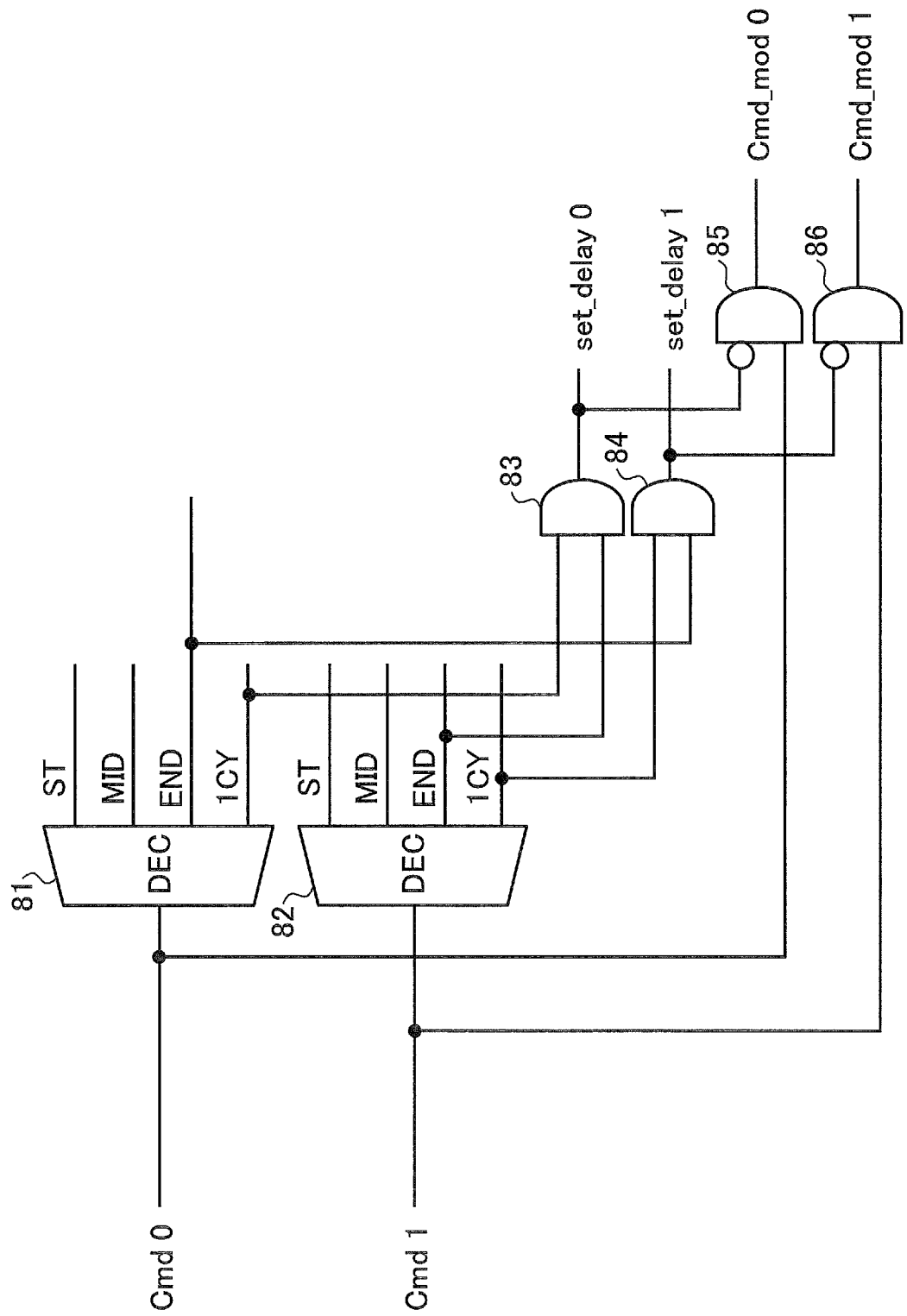
FIG. 15 is a figure illustrating a first portion of a logic circuit executing processing of the delay-&-swap processing unit.

FIG. 15 is a figure illustrating a first portion of a logic circuit executing processing of the delay-&-swap processing unit 31. A logic circuit illustrated in FIG. 15 includes a decoder 81, a decoder 82, an AND circuit 83, an AND circuit 84, an AND circuit 85 having one negative logic input, and an AND circuit 86 having one negative logic input. The decoder 81 decodes the command Cmd0 indicating the state of the first channel CH0, and causes one of the output signal lines that matches the decode result to be high. For example, in a case where the command Cmd0 is "END" indicating the ending cycle of the multi-cycle length packet, the decoder 81 sets the output signal line corresponding to "END" to high, and sets the other output signal lines to low. Likewise, the decoder 82 decodes the command Cmd1 indicating the state of the second channel CH1, and causes one of the output signal lines that matches the decode result to be high.

In a case where the first channel CH0 is a one-cycle packet in the current cycle and the channel CH1 is a packet ending, the AND circuit 83 sets output of a delay setting signal set_delay0 to high. In the other cases, the delay setting signal set_delay0 is set to low. In a case where the first channel CH0 is a packet ending in the current cycle and the channel CH1 is a one-cycle packet, the AND circuit 84 sets a delay setting signal set_delay1 to high. In the other cases, the delay setting signal set_delay1 is set to low. These delay setting signals set_delay0 and set_delay1 are used to set (start) the delay state in the channels CH0 and CH1, respectively.

The AND circuit 85 having one negative logic input generates Cmd_mod0 that is low in a cycle where the first channel CH0 is a one-cycle packet and the channel CH1 is a packet ending, and generates Cmd_mod0 that is equal to command Cmd0 in the other cases. The AND circuit 86 having one negative logic input generates Cmd_mod1 that is low in a cycle where the first channel CH0 is a packet ending and the channel CH1 is a one-cycle packet, and generates Cmd_mod1 that is equal to command Cmd1 in the other cases.

Figure 16A:
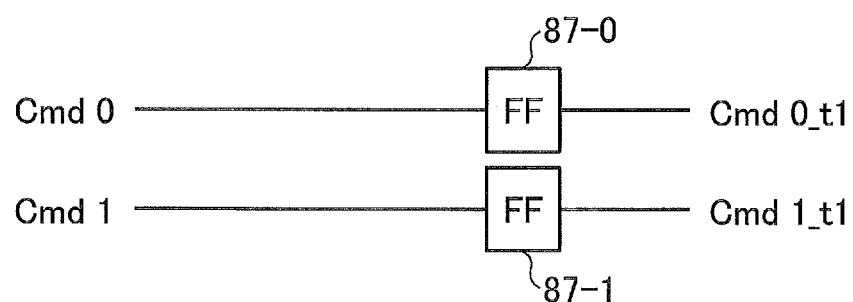
FIGS. 16A and 16B are figures illustrating a second portion of the logic circuit executing processing of the delay-&-swap processing unit.
Figure 16B:
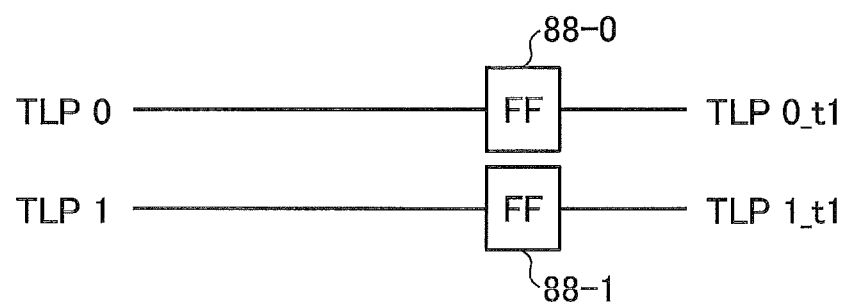

FIGS. 16A and 16B are figures illustrating a second portion of the logic circuit executing processing of the delay-&-swap processing unit 31. The logic circuit illustrated in FIGS. 16A and 16B includes D flip-flops 87-0, 87-1, 88-0, and 88-1. Each D flip-flop retrieves input data in synchronization with clock signals synchronized with the channels CH0 and CH1.

Accordingly, the D flip-flops 87-0 and 87-1 delay the commands Cmd0 and Cmd1, respectively, by one clock. The commands delayed by one clock are denoted as commands Cmd0_t1 and Cmd1_t1, respectively. The D flip-flops 88-0 and 88-1 delay the transaction layer packet TLP0 in the first channel CH0 and the transaction layer packet TLP1 in the second channel CH1, respectively, by one clock. The packets delayed by one clock are denoted as TLP0_t1 and TLP1_t1, respectively. As explained later, a delay state delayed by one clock can be set by replacing TLP0 and TLP1 with TLP0_t1 and TLP1_t1, respectively, when a predetermined condition is satisfied.

Figure 17:
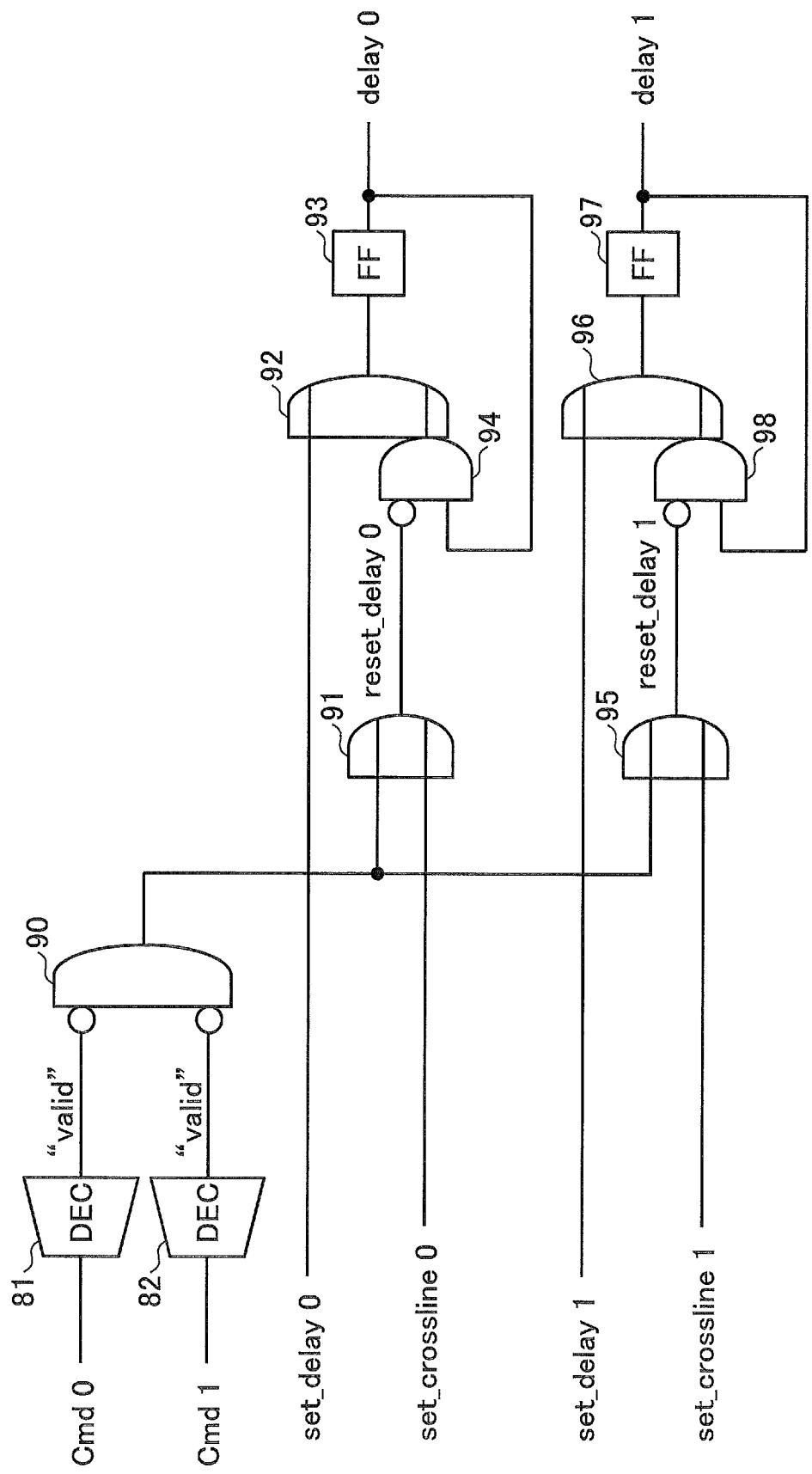
FIG. 17 is a figure illustrating a third portion of the logic circuit for executing processing of the delay-&-swap processing unit.

FIG. 17 is a figure illustrating a third portion of the logic circuit for executing processing of the delay-&-swap processing unit 31. The logic circuit as illustrated in FIG. 17 includes decoders 81 and 82, a negative logic input AND circuit 90, OR circuits 91 and 92, a D flip-flop 93, an AND circuit 94 having one negative logic input, OR circuits 95 and 96, a D flip-flop 97, and an AND circuit 98 having one negative logic input.

The output "valid" of the decoder 81 corresponds to OR operation of four outputs ST, MID, END, and 1CY illustrated in FIG. 15. The output "valid" of the decoder 82 corresponds to OR operation of the outputs ST, MID, END, and 1CY illustrated in FIG. 15. Therefore, the negative logic input AND circuit 90 (i.e., NOR circuit) generates an output that becomes high when all the four output signals of the decoder 81 and all the four output signals of the decoder 82 are low. As described above, the delay-&-swap processing unit 31 terminates the delay state of the channel when a cycle in which no packet exists in any one of the channels at the input side occurs in the state in which the channel is delayed. The output of the negative logic input AND circuit 90 is a detection signal detecting this "cycle in which no packet exists in any one of the channels."

When the delay setting signal set_delay0 illustrated in FIG. 15 becomes high in any given cycle, the delay state signal delay0 which is the output of the D flip-flop 93 becomes high from a subsequent cycle. The high state of the delay state signal delay0 continues until the D flip-flop 93 is reset. One of the conditions for causing this reset and terminating the delay state is that the output of the negative logic input AND circuit 90 becomes high, i.e., occurrence of a "cycle in which no packet exists in any one of the channels."

Likewise, when the delay setting signal set_delay1 illustrated in FIG. 15 becomes high in any given cycle, the delay state signal delay1 which is the output of the D flip-flop 97 becomes high from a subsequent cycle. The high state of the delay state signal delay1 continues until the D flip-flop 97 is reset. One of the conditions for causing this reset and terminating the delay state is that the output of the negative logic input AND circuit 90 becomes high, i.e., occurrence of a "cycle in which no packet exists in any one of the channels."

Figure 18:
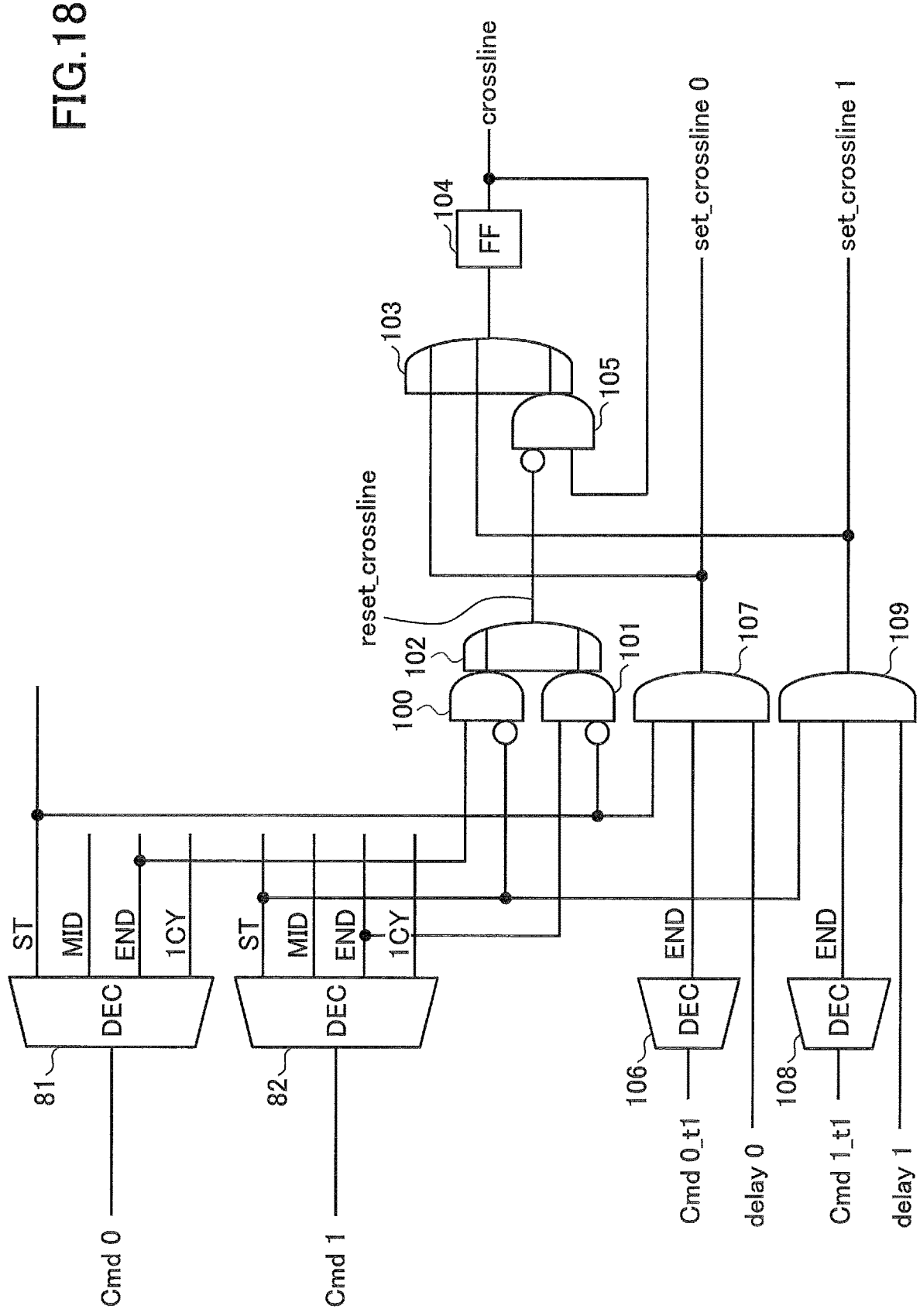
FIG. 18 is a figure illustrating a fourth portion of the logic circuit for executing processing of the delay-&-swap processing unit.

FIG. 18 is a figure illustrating a fourth portion of the logic circuit for executing processing of the delay-&-swap processing unit 31. The logic circuit illustrated in FIG. 18 includes decoders 81 and 82, AND circuits 100 and 101 each having one negative logic input, OR circuits 102 and 103, a D flip-flop 104, and an AND circuit 105 having one negative logic input. This logic circuit further includes a decoder 106, an AND circuit 107, a decoder 108, and an AND circuit 109.

The decoder 106 decodes a command Cmd0_t1 delayed by one cycle in the first channel CH0, and outputs the decode result. The AND circuit 107 derives a logical conjunction of the decode result ST of the command Cmd0 in the first channel CH0, the decode result END of the command Cmd0_t1 delayed by one cycle in the first channel CH0, and the delay state signal delay0 in the first channel CH0. When the ending of any given packet of multi-cycle length and the beginning of another packet of multi-cycle length are continuous in the channel CH0 in the delay state, the output of the AND circuit 107 becomes high, so that a signal set_crossline0 for setting the inter-channel data swap becomes high. In a subsequent clock cycle, a signal crossline indicating inter-channel data swap state becomes high.

The decoder 108 decodes a command Cmd1_t1 delayed by one cycle in the second channel CH1, and outputs the decode result. The AND circuit 109 derives a logical conjunction of the decode result ST of the command Cmd1 in the second channel CH1, the decode result END of the command Cmd1_t1 delayed by one cycle in the second channel CH1, and the delay state signal delay1 in the second channel. CH1. When the ending of any given packet of multi-cycle length and the beginning of another packet of multi-cycle length are continuous in the second channel CH1 in the delay state, the output of the AND circuit 109 becomes high, so that a signal set_crossline1 for setting the inter-channel data swap becomes high. In a subsequent clock cycle, a signal crossline indicating inter-channel data swap state becomes high.

In a case where, in a cycle in which the ending of any given packet of multi-cycle length is detected in the first channel CH0, the beginning of another packet of multi-cycle length is not detected in the second channel CH1, the output of the AND circuit 100 having one negative logic input is set to high. Likewise, in a case where, in a cycle in which the ending of any given packet of multi-cycle length is detected in the second channel CH1, the beginning of another packet of multi-cycle length is not detected in the first channel CH0, the output of the AND circuit 101 having one negative logic input is set to high. When the output of the AND circuit 100 or 101 is set to high, the data swap reset signal reset_crossline becomes high, and a signal crossline indicating inter-channel data swap state is reset. In other words, when the ending of the multi-cycle length packet and the beginning of the multi-cycle length packet do not overlap between channels at the input side, the inter-channel data swap state is terminated.

The signal set_crossline0 for setting the inter-channel data swap is applied to one of the inputs of the OR circuit 91 illustrated in FIG. 17. As a result, in a case where the ending of any given multi-cycle length packet and the beginning of another multi-cycle length packet are continuous in the channel CH0 in the delay state, the delay state reset signal reset_delay0 for terminating the delay state of the channel CH0 is set to high. When the delay state reset signal reset_delay0 is set to high, the delay state of the channel CH0 is terminated.

Likewise, the signal set_crossline1 for setting the inter-channel data swap is applied to one of the inputs of the OR circuit 95 illustrated in FIG. 17. Therefore, when the ending of a multi-cycle length packet and the beginning of a multi-cycle length packet are continuous in the channel CH1 in the delay state, the delay state reset signal reset_delay1 for terminating the delay state of the channel CH1 is set to high. When the delay state reset signal reset_delay1 is set to high, the display state of the channel CH1 is terminated.

Figure 19:
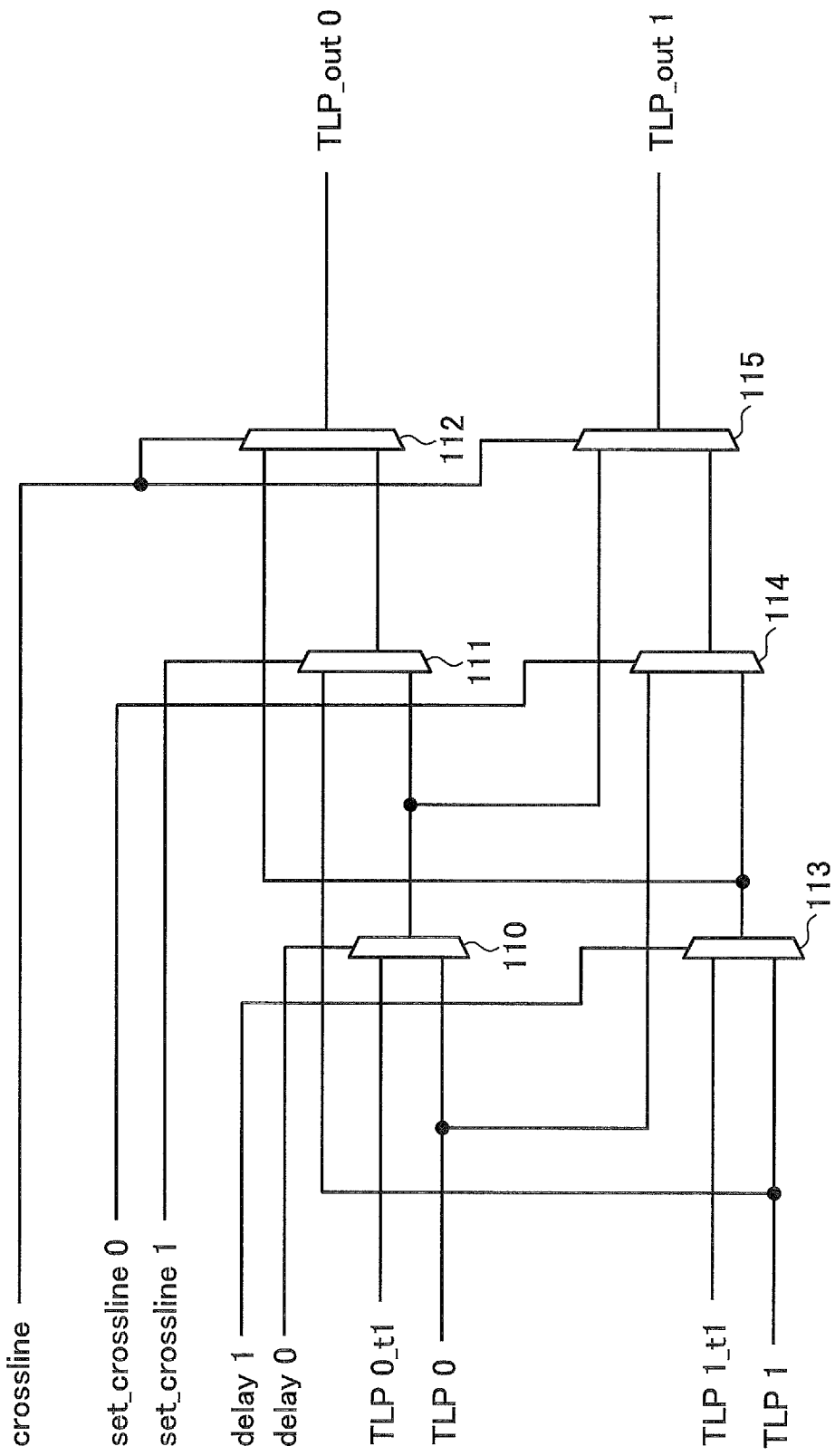
FIG. 19 is a figure illustrating a fifth portion of the logic circuit for executing processing of the delay-&-swap processing unit.

FIG. 19 is a figure illustrating a fifth portion of the logic circuit for executing processing of the delay-&-swap processing unit. The logic circuit illustrated in FIG. 19 includes selector circuits 110 to 115.

When the delay state signal delay0 is low, the selector circuit 110 selects the packet TLP0 which is not delayed, and when the delay state signal delay0 is high, the selector circuit 110 selects the packet TLP0_t1 which is delayed by one cycle. Then, the selector circuit 110 outputs the selected packet. Likewise, when the delay state signal delay1 is low, the selector circuit 113 selects the packet TLP1 which is not delayed, and when the delay state signal delay1 is high, the selector circuit 113 selects the packet TLP1_t1 which is delayed by one cycle. Then, the selector circuit 113 outputs the selected packet. As described above, the delay operation for the channels CH0 and CH1 by the delay-&-swap processing unit 31 is executed by controlling the selector circuits 110 and 113.

Only one of the data swap setting signal set_crossline1 and the data swap state signal crossline which are selection control signals applied to the selector circuits 111 and 112 becomes high in a period for performing data swap between channels. More specifically, only in a cycle for starting (setting) the inter-channel data swap, the data swap setting signal set_crossline1 becomes high, and in subsequent cycles, the data swap state signal crossline is maintained at high. In periods in which these signals are high, the selector circuits 111 and 112 select packets in the channel CH1 instead of the channel CH0, and outputs the selected packets. As a result, packets obtained by performing data swap between the channels are output from the output TLP_out0.

Only one of the data swap setting signal set_crossline0 and the data swap state signal crossline which are selection control signals applied to the selector circuits 114 and 115 becomes high in a period for performing data swap between channels. More specifically, only in a cycle for starting (setting) the inter-channel data swap, the data swap setting signal set_crossline0 becomes high, and in subsequent cycles, the data swap state signal crossline is maintained at high. In periods in which these signals are high, the selector circuits 114 and 115 select packets in the channel CH0 instead of the channel CH1, and outputs the selected packets. As a result, packets obtained by performing data swap between the channels are output from the output TLP_out1.

Figure 20:
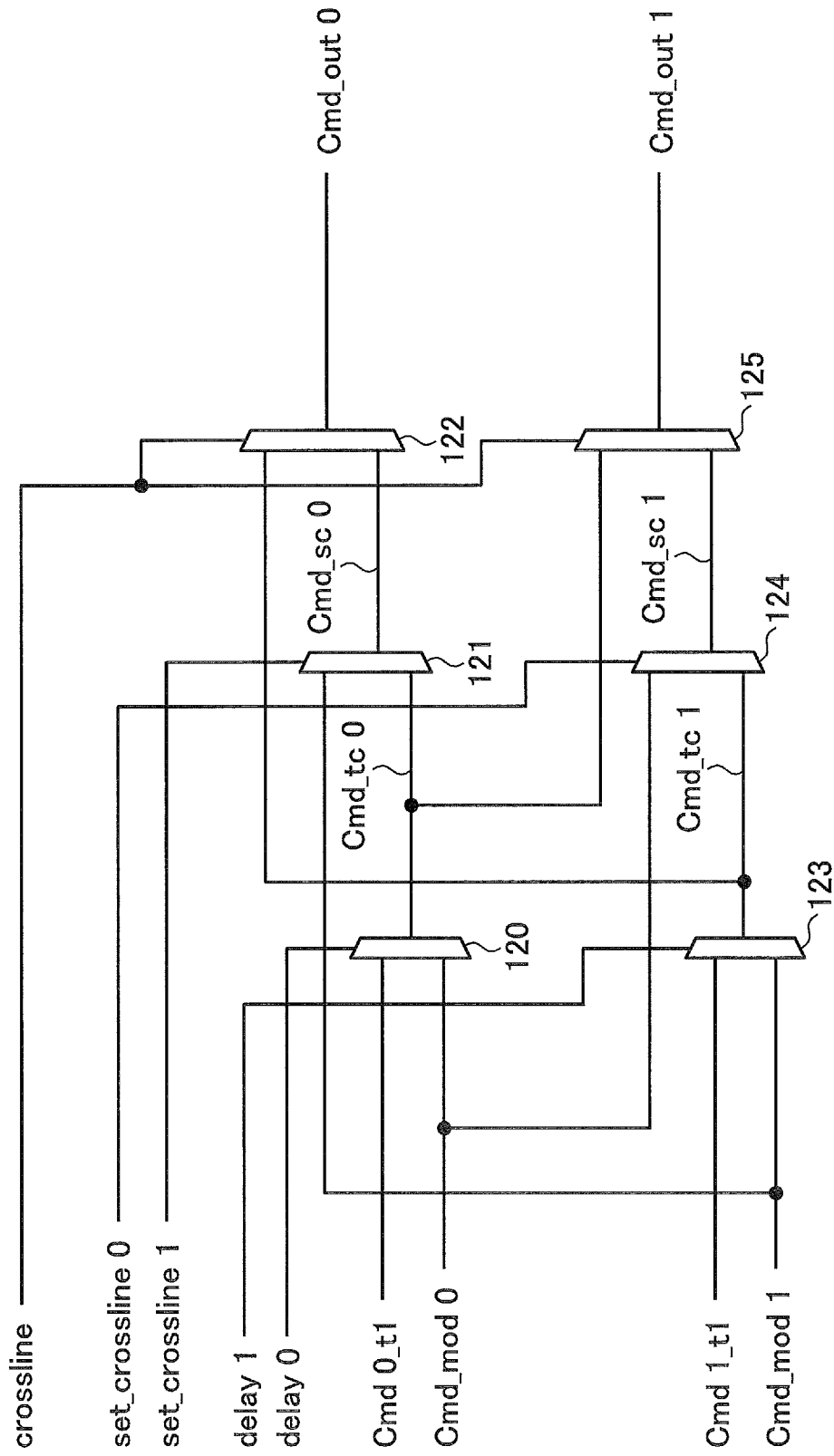
FIG. 20 is a figure illustrating a sixth portion of the logic circuit for executing processing of the delay-&-swap processing unit.

FIG. 20 is a figure illustrating a sixth portion of the logic circuit for executing processing of the delay-&-swap processing unit 31. The logic circuit illustrated in FIG. 20 includes selector circuits 120 to 125. The configuration of the circuit illustrated in FIG. 20 and the applied selector control signals are the same as the configuration of the circuit illustrated in FIG. 19 and the applied selector control signals, and are different only in that the signals which are input into the selector circuits to be selected are not packets but are commands. The logic circuit illustrated in FIG. 20 operates in a manner similar to the logic circuit illustrated in FIG. 19, and the selector circuits 120 to 125 execute, as necessary, delay of commands in each channel and swapping of commands between channels.

Figure 21:
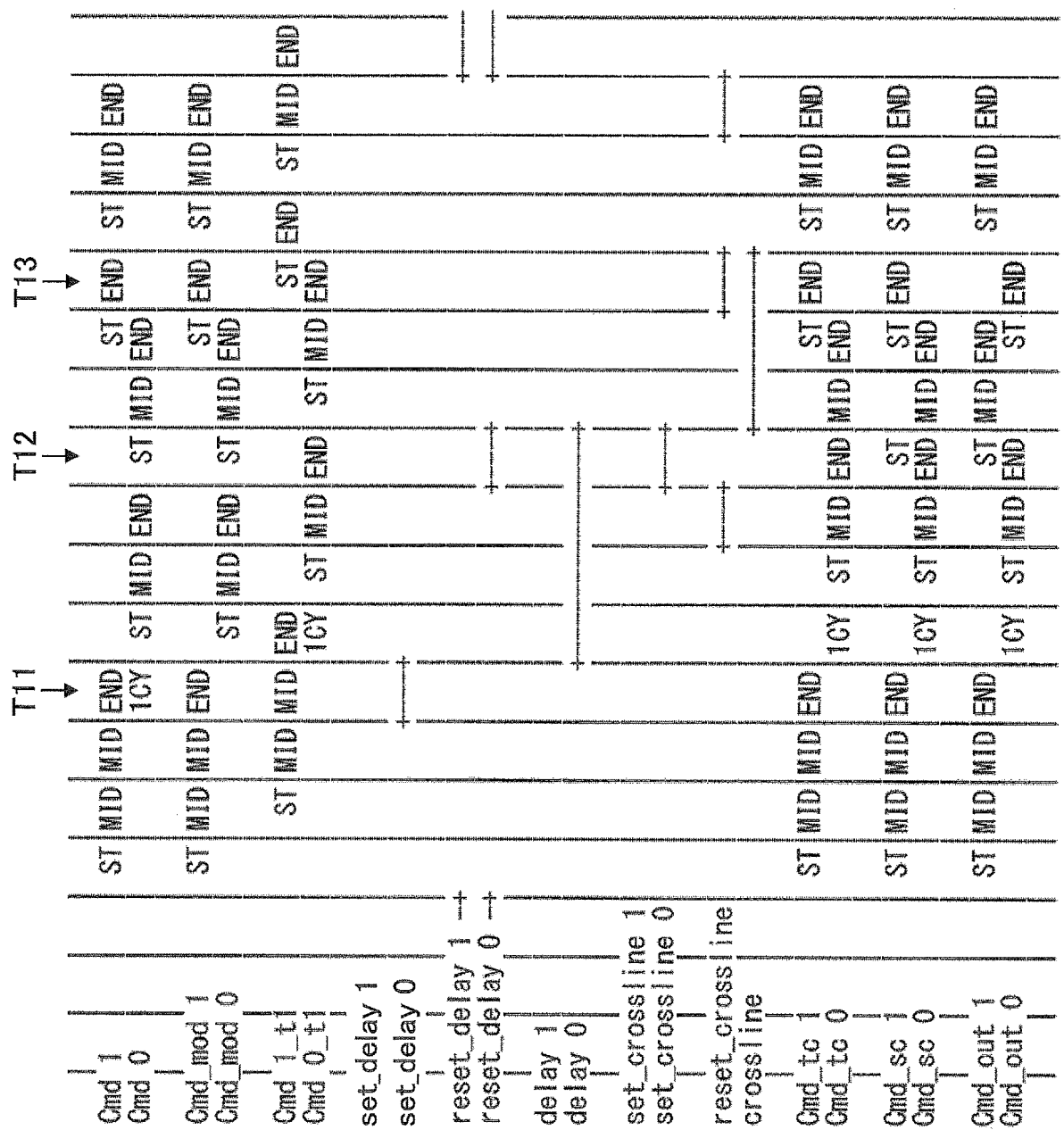
FIG. 21 is a timing chart illustrating a change of state of each signal illustrated in FIG. 15 to FIG. 20.

FIG. 21 is a timing chart illustrating a change of state of each signal illustrated in FIG. 15 to FIG. 20. The temporal change of commands in the channels CH0 and CH1 are shown as commands Cmd0 and Cmd1 in the uppermost row of FIG. 21. The other portion of FIG. 12 illustrates how the signal portions of the circuits illustrated in FIG. 15 to FIG. 20 change when commands shown in the commands Cmd0 and Cmd1 are given.

For example, in a cycle T11, the ending of a packet of multi-cycle length (i.e., "END" of command Cmd1) in the channel CH1 and the ending of another packet of one-cycle length (i.e., "1CY" pf command Cmd0) in the channel CH0 overlap. As a result, the delay setting signal set_delay0 becomes high in this cycle T11 (a section in which a line is drawn in FIG. 21 indicates a cycle in which the signal value is high.) In accordance with the high setting of this delay setting signal set_delay0, the delay state signal delay0 is maintained at high for some period after the cycle T11 (in this example, for a period of four cycles). In this period, as indicated by the command Cmd_out0, the command of the channel CH0 is delayed by one cycle.

Also, in a cycle T12, the ending of a packet of multi-cycle length ("END" of Cmd0) and the beginning of a packet of multi-cycle length ("ST" of Cmd0) are continuous at the input side. As a result, in this cycle T12, the delay state reset signal reset_delay0 becomes high, and accordingly, the high state of the delay state signal delay0 is terminated. In this cycle T12, the data swap setting signal set_crossline0 becomes high, and accordingly, the data swap state signal crossline maintains high for some period after the cycle T12 (in this example, for a period of three cycles). In this period, as indicated by the commands Cmd_out0 and Cmd_out1, the commands swapped between the channels are output.

Further, in the cycle T13, the ending of the multi-cycle length packet ("END" of Cmd1) and the beginning of another multi-cycle length packet do not overlap at the input side. As a result, in this cycle T13, the data swap reset signal reset_crossline becomes high, and the data swap state signal crossline is reset. As a result, the data swap state between the channels is terminated.

As explained above, the logic circuit operating based on command synchronized with packets is implemented by using the decoder, the logic circuit, the delay circuit, and the selector circuit illustrated in FIG. 15 to FIG. 21, so that the delay of packet data and swapping between channels can be controlled. Therefore, the delay-&-swap processing can be achieved efficiently at high speed with simple configuration.

Figure 22:
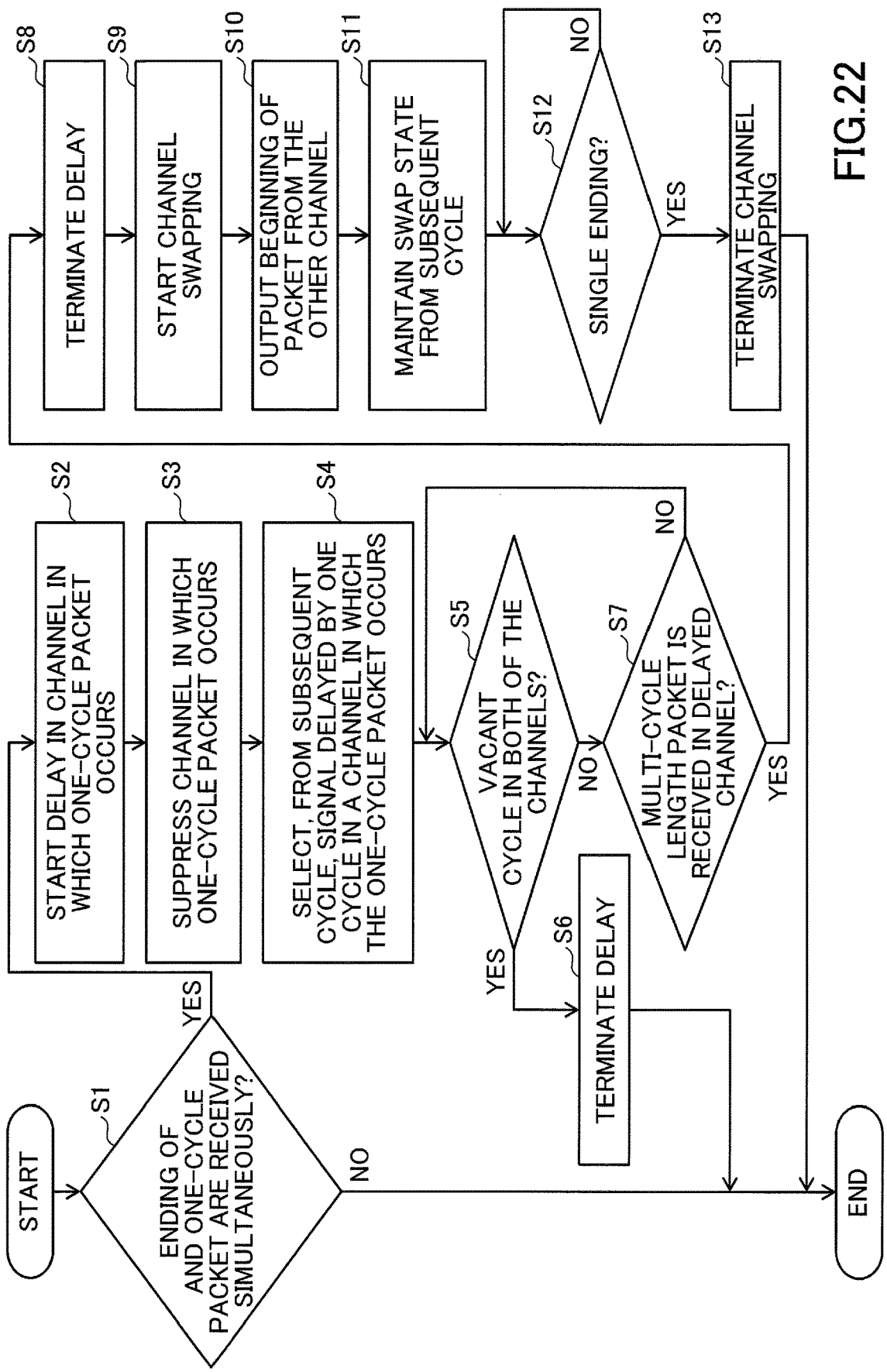
FIG. 22 is a flowchart illustrating a flow of processing of delay swap operation performed by the delay-&-swap processing unit.

FIG. 22 is a flowchart illustrating a flow of processing of delay swap operation performed by the delay-&-swap processing unit 31. In FIG. 22, the order of execution of each step described in the flowchart is merely an example, and the technical scope intended by the present application is not limited to the order of execution described. For example, even when the present application describes that a step B is executed subsequently to a step A, it is possible to not only execute the step B subsequently to the step A, but also execute the step A subsequently to the step B in some cases in terms of physical and logical aspect. In this case, it is to be understood that the step A can be executed subsequently to the step B for the technical object of the disclosure of the present application, as long as all the results affecting the processing of the flowchart are the same no matter in what order the steps are executed. Even if the present application describes that the step B is executed subsequently to the step A, it is not intended to exclude the above case from the intended technical scope of the present application, and it is to be understood that such a case is within the intended technical scope of the present application.

In step S1, the delay-&-swap processing unit 31 determines whether the ending of a packet of multi-cycle length and one-cycle packet are received simultaneously or not. In a case where the determination result is NO, the delay-&-swap processing unit 31 terminates the processing of the order illustrated in FIG. 22. In a case where the determination result is YES, the processing proceeds to step S2.

In step S2, the delay-&-swap processing unit 31 starts delay in a channel in which the one-cycle packet occurs. In step S3, in a cycle CYL1 in which the one-cycle packet occurs, the delay-&-swap processing unit 31 suppresses command output in the channel in which the one-cycle packet occurs. In step S4, the delay-&-swap processing unit 31 selects, from a cycle subsequent to the cycle CYL1, a signal (command and packet) delayed by one cycle in a channel in which the one-cycle packet occurs.

In step S5, the delay-&-swap processing unit 31 determines whether a cycle in which no packet exists in any of the channels occurs or not. In a case where the determination result is YES, the delay-&-swap processing unit 31 terminates the delay state in step S6, and thereafter terminates the processing of the procedure illustrated in FIG. 22. In a case where the determination result is NO, the processing proceeds to step S7.

In step S7, the delay-&-swap processing unit 31 determines whether the beginning of a packet of multi-cycle length is received or not in the channel that is set to be delayed. In a case where the determination result is NO, the delay-&-swap processing unit 31 returns back to step S5 and continues subsequent processing. In a case where the determination result is YES, the processing proceeds to step S8.

In step S8, in the channel that is set to be delayed, the delay-&-swap processing unit 31 terminates the delay state in a cycle CYL2 in which the beginning of a packet of multi-cycle length is received. In step S9, the delay-&-swap processing unit 31 asserts a signal for setting data swap between the channels in the cycle CYL2. In step S10, the delay-&-swap processing unit 31 outputs, from the channel other than the channel in which the delay had been set, the beginning of the packet of multi-cycle length in the cycle CYL2. In step S10, the delay-&-swap processing unit 31 maintains, from a cycle subsequent to the cycle CYL2, the data swap state between the channels.

In step S12, the delay-&-swap processing unit 31 determines whether a single ending of the packet of multi-cycle length is received or not. In a case where the determination result is NO, the delay-&-swap processing unit 31 returns back to step S12 to continue subsequent processing. In a case where the determination result is YES, the processing proceeds to step S13. In step S13, the delay-&-swap processing unit 31 terminates the inter-channel data swap state. The procedure performed by the delay-&-swap processing unit 31 to control the delay and swapping of packets has been hereinabove explained.

The present invention has been hereinabove explained based on the embodiment, but the present invention is not limited to the above embodiment, and can be modified in various manners within the scope of the claims.

For example, in the explanation in the above embodiment, PCIe is adopted as an example for explanation. However, the configuration of the present application can be applied to any packet reception system in which problems similar to the above embodiment occur. More specifically, the delay-&-swap processing explained in the above embodiment can be applied in a situation where it is desired to solve a state in which the ending of the preceding packet and the ending of a subsequent one-cycle packet overlap between two channels in the same cycle.

According to at least one embodiment of the disclosure of the present application, packets overlapping between two channels can be processed while suppressing the cost of packet reception processing resources.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An arithmetic processing apparatus comprising:
a delay-&-swap processing circuit configured to, upon detecting that an ending of a first packet received from an input side of a first channel and a beginning of a second packet received from an input side of a second channel overlap in a same cycle, and also detecting that the second packet is a packet of one-cycle length, place an output side of the second channel into a delay state by delaying the output side of the second channel by one cycle; and
a packet processing circuit configured to perform processing on packets which are output from the two channels by the delay-&-swap processing circuit.

2. The arithmetic processing apparatus according to claim 1, wherein the delay-&-swap processing circuit is configured to terminate the delay state upon an occurrence of, during the delay state, a cycle in which there is no packet at the input side of any of the two channels.

3. The arithmetic processing apparatus according to claim 1, wherein the delay-&-swap processing circuit is configured to terminate the delay state and start a data swap state for swapping data between the two channels at the output side of the two channels, upon an occurrence that, in the delay state, an ending of a third packet of multi-cycle length and a beginning of a fourth packet of multi-cycle length are continuous at the input side of the second channel.

4. The arithmetic processing apparatus according to claim 3, wherein the delay-&-swap processing circuit is configured to, upon detecting an absence of a condition that, in the data swap state, an ending of a fifth packet of multi-cycle length and a beginning of another multi-cycle length packet overlaps at the input side of the two channels, terminate the data swap state in a cycle in which the ending of the fifth packet occurs.

5. The arithmetic processing apparatus according to claim 1, wherein the delay-&-swap processing circuit comprises:
a decoder configured to decode a state of a packet at the input side of the two channels to yield first outputs;
a logic circuit configured to perform logical operations on the first outputs to yield a second output;
a delay circuit configured to delay data received from the input side of the two channels; and
a first selector circuit configured to select, in accordance with the second output, either the data at the input side of the two channels or data that is output from the delay circuit.

6. The arithmetic processing apparatus according to claim 5, wherein the delay-&-swap processing circuit comprises:
a second selector circuit configured to select, in accordance with the second output, one of data corresponding to the first channel and data corresponding to the second channel; and
a third selector circuit configured to select, in accordance with the second output, another of the data corresponding to the first channel and the data corresponding to the second channel.

7. A control method for an arithmetic processing apparatus that processes packets in two channels including a first channel and a second channel, the control method comprising:
upon detecting that an ending of a first packet received from an input side of the first channel and a beginning of a second packet received from an input side of the second channel overlap in a same cycle, and also detecting that the second packet is a packet of one-cycle length, placing an output side of the second channel into a delay state by delaying the output side of the second channel by one cycle; and
performing processing on packets which are at the output side of the two channels.

* * * * *